(12) United States Patent
Kimori et al.

(10) Patent No.: US 11,149,860 B2
(45) Date of Patent: Oct. 19, 2021

(54) GATE VALVE

(71) Applicant: SMC CORPORATION, Tokyo (JP)

(72) Inventors: Naoki Kimori, Tsukuba (JP); Hiroshi Ogawa, Okegawa (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/185,167

(22) Filed: Feb. 25, 2021

(65) Prior Publication Data

US 2021/0270375 A1 Sep. 2, 2021

(30) Foreign Application Priority Data

Feb. 28, 2020 (JP) .............................. JP2020-033503

(51) Int. Cl.
*F16K 3/18* (2006.01)
*F16K 3/02* (2006.01)
*F16K 51/02* (2006.01)

(52) U.S. Cl.
CPC ............ *F16K 3/184* (2013.01); *F16K 3/0218* (2013.01); *F16K 51/02* (2013.01)

(58) Field of Classification Search
CPC . F16K 51/02; F16K 3/18; F16K 3/184; F16K 3/0218; F16K 3/0281
See application file for complete search history.

(56) References Cited

U.S. PATENT DOCUMENTS

| | | | | |
|---|---|---|---|---|
| 5,566,922 A | * | 10/1996 | Tanaka | F16K 3/188 251/157 |
| 5,667,197 A | * | 9/1997 | Boyd | F16K 3/18 137/559 |
| 5,934,646 A | * | 8/1999 | Tamura | F16K 3/18 251/193 |
| 6,095,180 A | * | 8/2000 | Ishigaki | F16K 49/002 137/341 |
| 8,800,956 B2 | * | 8/2014 | Ishigaki | F16K 3/16 251/58 |
| 9,599,233 B2 | * | 3/2017 | Ishigaki | F16K 27/044 |
| 10,364,901 B2 | * | 7/2019 | Iwabuchi | F16K 51/02 |
| 2020/0096127 A1 | * | 3/2020 | Iwabuchi | F16K 31/122 |

FOREIGN PATENT DOCUMENTS

JP 3349962 B2 11/2002

* cited by examiner

*Primary Examiner* — David Colon-Morales
(74) *Attorney, Agent, or Firm* — Oblon, McClelland, Maier & Neustadt, L.L.P.

(57) ABSTRACT

A gate valve includes a valve plate that opens and closes a gate opening, a valve shaft that is fixed to the valve plate, an air cylinder that includes a drive rod, and a valve moving mechanism that causes, by expanding and contracting movements of the drive rod, the valve plate to move between a hermetically closed position at which the gate opening is hermetically closed by the valve plate and a full open position at which the gate opening is fully opened. A cylinder housing of the air cylinder is provided with a locking mechanism that locks the valve plate that has moved to the hermetically closed position and a lock detection unit that detects a locked state of the valve plate. The locking mechanism includes a lock piston that is capable of advancing and retreating with respect to the cylinder housing. A cam frame that is fixed to the drive rod has an engagement hole. The lock detection unit detects whether the lock piston is in a state of being engaged in the engagement hole.

7 Claims, 13 Drawing Sheets

GATE VALVE

TECHNICAL FIELD

The present invention relates to a gate valve that is attached to an opening of a vacuum processing chamber in, for example, semiconductor production equipment or the like or to a transfer path connected to the opening so as to allow the vacuum processing chamber to communicate with another chamber or the like through the opening or so as to hermetically close the vacuum processing chamber.

BACKGROUND ART

In general, a gate valve includes a valve plate that opens and closes a gate opening communicating with a vacuum processing chamber, a valve shaft that is attached to the valve plate, and an air cylinder that drives the valve shaft. As a result of compressed air being supplied and discharged to and from the air cylinder, the valve shaft is driven so as to cause the valve plate to reciprocate between a hermetically closed position at which the gate opening is hermetically closed and a full open position at which the gate opening is fully opened via an intermediate position at which the valve plate faces the gate opening with a distance therebetween.

As described in PTL 1, in such a gate valve, a valve shaft is tilted toward a hermetically closed position when a valve plate is moved from an intermediate position to the hermetically closed position, so that a seal member of the valve plate is pressed against a valve sheet of a gate opening so as to close the gate opening.

The position of the valve plate at the hermetically closed position is maintained by keeping the pressure of compressed air in an air cylinder constant. Thus, if the pressure of the compressed air in the air cylinder is lost in a state where the valve plate has moved to the hermetically closed position, there is a possibility that the gate opening will open and its hermetically closed state cannot be maintained.

Accordingly, the gate valve described in PTL 1 includes a locking mechanism that locks movement of the valve plate in a state where the valve plate has moved to the hermetically closed position. This locking mechanism restricts movement of a piston of the air cylinder by engaging a lock cylinder that is provided in a cylinder tube of the air cylinder and that is capable of advancing and retreating with respect to the piston into a groove that is formed in the piston when the air cylinder is in a contracted state.

This lock cylinder of the locking mechanism is slidably disposed in a housing that is attached to the cylinder tube of the air cylinder. A lock spring that urges the lock cylinder in a direction in which the lock cylinder advances toward the piston is disposed in the housing, while compressed air for causing the lock piston to move in a retreating direction away from the piston can be supplied in the housing. Thus, if supply of the compressed air to the housing is stopped when the air cylinder contracts, the lock cylinder is urged by the lock spring in the direction in which the lock cylinder advances toward the piston, so that the lock cylinder is inserted into the groove formed in the piston, and the movement of the piston can be restricted.

CITATION LIST

Patent Literature

PTL 1: Japanese Patent No. 3349962

SUMMARY OF INVENTION

Technical Problem

However, in the locking mechanism described in PTL 1, if the lock spring breaks in a state where the valve plate has moved to the hermetically closed position, there is a possibility that the lock cylinder may not be able to advance toward the groove of the piston. Thus, the valve plate may become movable and may sometimes not be able to hermetically close the chamber through the gate opening. In this case, since the lock spring is provided in the housing, it is difficult to determine whether the lock cylinder of the locking mechanism has advanced toward the groove of the piston and is engaged in the groove. Accordingly, there has been a demand for a gate valve capable of determining whether a lock cylinder is engaged in a groove of a piston.

Accordingly, it is a technical object of the present invention to provide a gate valve capable of determining whether a lock piston of a locking mechanism is engaged with a to-be-engaged portion.

Solution to Problem

In order to solve the above problem, a gate valve according to the present invention is a gate valve in which a gate opening formed in a valve casing is opened and closed by a valve plate disposed in the valve casing and includes the valve plate, a valve shaft that has an end portion attached to the valve plate and another end portion extending from the valve casing and that is supported in such a manner as to be movable with respect to the valve casing, an air cylinder that is disposed outside the valve casing and that includes a drive rod, and a valve moving mechanism that causes the valve plate to move along with expanding and contracting movements of the drive rod of the air cylinder via the valve shaft such that the valve plate reciprocates between a hermetically closed position at which the gate opening is hermetically closed by the valve plate and a full open position at which the gate opening is fully opened. The valve moving mechanism includes a first block that is fixed to the drive rod, a second block that is fixed to the valve shaft extending from the valve casing, and a connecting member that connects the second block to the first block such that the second block is movable relative to the first block. The air cylinder includes a cylinder housing that supports the drive rod such that the drive rod is capable of expanding and contracting. The cylinder housing is provided with a locking mechanism for locking the valve plate that has moved to the hermetically closed position and a lock detection unit that is capable of determining whether the valve plate is in a state of being locked by the locking mechanism. The locking mechanism includes a lock piston that is disposed in a facing wall of the cylinder housing, the facing wall facing the first block, so as to be capable of advancing and retreating with respect to the first block. The first block has an engagement hole that is formed such that the lock piston that has advanced toward the first block is engaged in the engagement hole in a state in which the valve plate has moved to the hermetically closed position. The lock detection unit is capable of detecting whether the lock piston is in a state of being engaged in the engagement hole.

It is preferable that the lock detection unit include a target member that is to be detected and that is provided at an end portion of the lock piston on a retreating side in such a manner as to extend toward the retreating side from and a detection main-body portion that detects the target member when the lock piston is in a state of being engaged in the engagement hole.

In this case, it is further preferable that the detection main-body portion be a proximity sensor and that the target member have a smaller-diameter portion that is formed on an advancing side in an advancing/retreating direction of the lock piston so as to extend in the advancing/retreating direction and a larger-diameter portion that is formed on the retreating side in the advancing/retreating direction so as to be larger than the smaller-diameter portion. It is further preferable that the proximity sensor detect the larger-diameter portion of the target member to be detected when the lock piston is in a state of being engaged in the engagement hole.

In addition, the lock piston, the target member, and the proximity sensor may be arranged in an accommodating unit that is provided in the cylinder housing, and the accommodating unit may be detachably attached to a cutout portion that is formed in the cylinder housing.

Furthermore, the proximity sensor may be an inductive proximity sensor, and the accommodating unit may be made of a non-magnetic material. The target member may be made of a magnetic material that has electrical conductivity.

Furthermore, a drive piston that is fixed to the drive rod may be provided in the cylinder housing of the air cylinder. A first pressure chamber that drives the valve plate from the full open position toward the hermetically closed position may be formed in the cylinder housing so as to be closer to the drive rod than the drive piston is, and a second pressure chamber that drives the valve plate from the hermetically closed position toward the full open position may be formed in the cylinder housing so as to be located on a side opposite to a side on which the drive rod is disposed with respect to the drive piston. The lock piston of the locking mechanism may be accommodated in an accommodating hole that is formed in the facing wall of the cylinder housing. An urging spring that causes the lock piston to advance toward the first block may be provided on the retreating side of the lock piston in the advancing/retreating direction. An unlocking pressure chamber for causing the lock piston to retreat may be formed on the advancing side of the lock piston in the advancing/retreating direction. The unlocking pressure chamber may communicate with a lock air passage that is connected to a port through which compressed air is supplied to the second pressure chamber.

Furthermore, the valve moving mechanism may cause the valve plate to reciprocate between the hermetically closed position and the full open position via an intermediate position at which the valve plate faces the gate opening with a distance between the valve plate and the gate opening.

Advantageous Effects of Invention

As described above, according to the present invention, a gate valve capable of determining whether a lock piston of a locking mechanism is engaged with a to-be-engaged portion can be provided.

BRIEF DESCRIPTION OF DRAWINGS

FIG. 2A is a bottom view of the gate valve.

DESCRIPTION OF EMBODIMENTS

A gate valve according to an embodiment of the present invention will be described below. In the present embodiment, as an example, a gate valve will be described in which a valve plate is capable of moving up and down with respect to a gate opening formed in a valve casing and in which the valve plate is capable of reciprocating between a hermetically closed position at which the gate opening is hermetically closed by the valve plate and a full open position at which the gate opening is fully open via an intermediate position at which the valve plate faces the gate opening with a distance therebetween. In addition, in the following description, in order to explain each component, the scale and so forth of each structure may sometimes be different from those of the actual structure.

Figure 1:
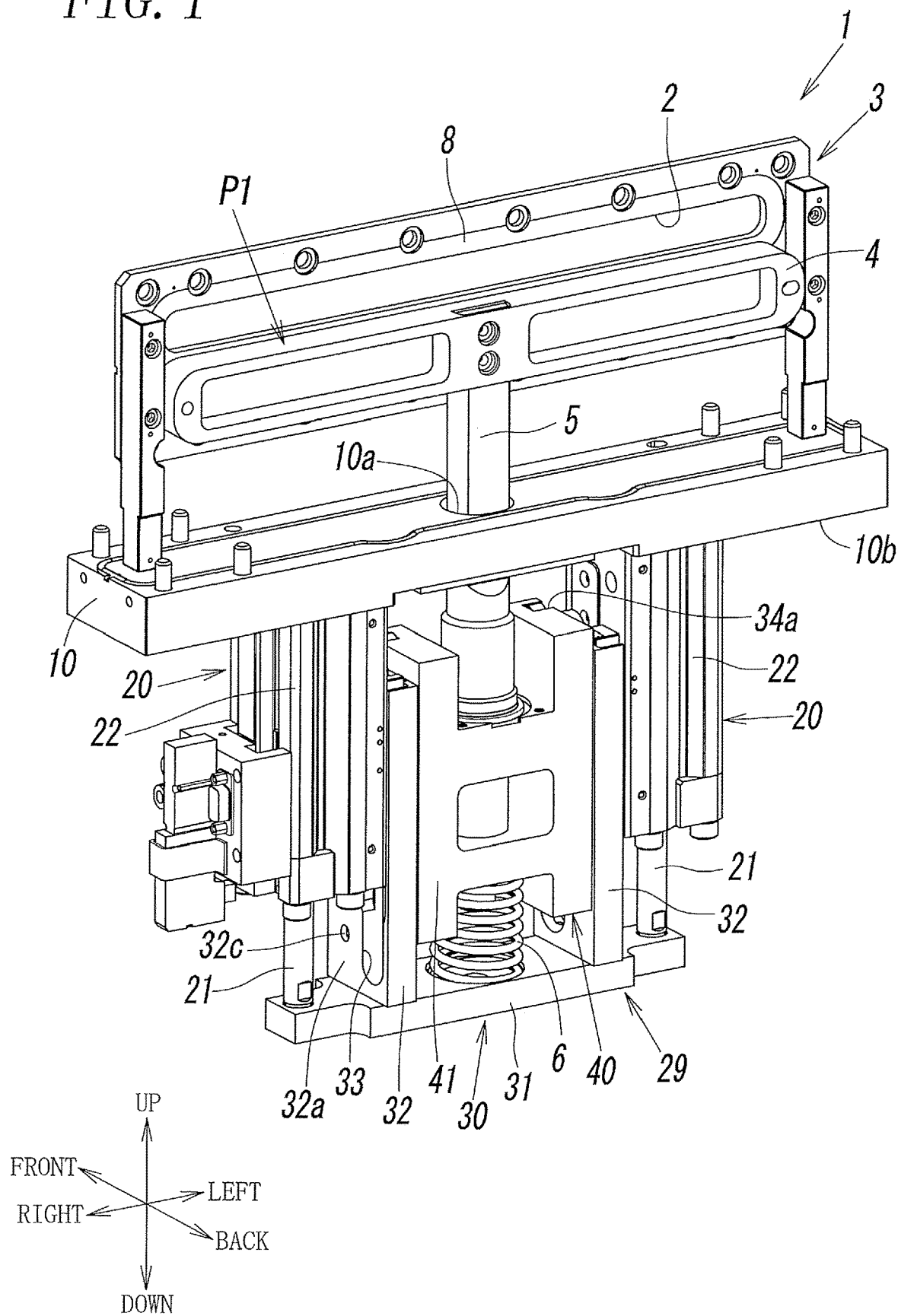
FIG. 1 is a perspective view illustrating a gate valve according to an embodiment of the present invention in a state where a valve plate that is exposed as a result of omitting illustration of a portion of a valve casing is located at a full open position at which a gate opening is fully open.

In the present specification, the heightwise direction of the gate valve illustrated in FIG. 1 will be simply referred to as the "vertical direction". The widthwise direction of the gate valve when the gate valve is viewed from the front will be simply referred to as the "transverse direction". A direction perpendicular to the widthwise direction of the gate valve will be simply referred to as the "longitudinal direction".

<Overall Configuration>

As illustrated in FIG. 1, FIG. 2A, FIG. 2B, and FIG. 3, a gate valve 1 according to an embodiment of the present invention includes a valve casing 3 (see FIG. 6) that has a gate opening 2 for communicating with a vacuum processing chamber, which is not illustrated, a valve plate 4 that is accommodated in the valve casing 3, a valve shaft 5 that is attached to the valve plate 4, air cylinders 20 each of which includes a drive rod 21, and a valve moving mechanism 29 that causes the valve plate 4 to reciprocate between a hermetically closed position P3 (see FIG. 8) at which the gate opening 2 is hermetically closed by the valve plate 4 and a full open position P1 (see FIG. 1 and FIG. 6) at which the gate opening 2 is fully open via an intermediate position P2 (see FIG. 7) at which the valve plate 4 faces the gate opening 2 with a distance therebetween.

The gate valve 1 further includes locking mechanisms 50 (see FIG. 10) that lock the valve plate 4 at the hermetically closed position P3 and lock detection units 60 (see FIG. 11A) that are capable of determining whether the valve plate 4 is locked by the locking mechanisms 50. Each component member will be described in detail below.

(Valve Plate)

Figure 6:
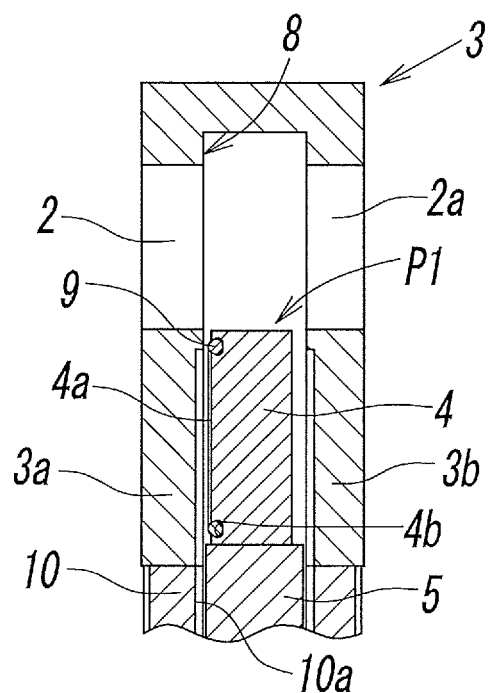
FIG. 6 is a partially enlarged cross-sectional view of the valve casing in a case where the valve plate is located at the full open position with respect to the gate opening.

As illustrated in FIG. 1 and FIG. 6, the valve plate 4 is formed in a substantially rectangular plate-like shape that is long in the transverse direction. The front surface of the valve plate 4 has a sealing surface 4a that is formed substantially flat, and an annular sealing groove 4b is formed in an outer peripheral portion of the sealing surface 4a. An annular sealing member 9, such as an O-ring, that is made of an elastic material is placed in the sealing groove 4b such that a portion thereof projects from the sealing surface 4a.

(Valve Casing)

The valve casing 3 is formed in a hollow box shape and has a pair of side walls 3a and 3b that face each other and are spaced apart from each other in the longitudinal direction. The gate opening 2 is formed in an upper portion of the side wall 3a that is positioned on a front side, and a rear-surface-side opening 2a having a shape and a size substantially the same as those of the gate opening 2 is formed in an upper portion of the side wall 3b that is positioned on a rear side such that the rear-surface-side opening 2a is positioned at the same level as that of the gate opening 2. The gate opening 2 has a substantially rectangular shape that is long in the transverse direction like the valve plate 4 and is formed so as to be slightly smaller than the valve plate 4. An annular valve sheet 8 having a flat surface is provided on an outer peripheral portion of the gate opening 2 that is included in an inner surface of the side wall 3a such that the valve sheet 8 surrounds the gate opening 2. The sealing member 9 is brought into and out of contact with the valve sheet 8 along with movement of the valve plate 4, so that the gate opening 2 is opened and closed.

As illustrated in FIG. 1 and FIG. 6, a bonnet 10 is hermetically provided on the bottom of the valve casing 3 so as to extend between lower end portions of the pair of side walls 3a and 3b and is fixed to the side walls 3a and 3b. A center portion of the bonnet 10 in the transverse direction has a through hole 10a that is formed so as to extend through the center portion in the vertical direction, and the valve shaft 5 is inserted in the through hole 10a so as to be movable in the vertical direction (the direction in which an axis L1 extends (see FIG. 2A)) and the longitudinal direction. In the present embodiment, the through hole 10a has a circular shape when viewed in plan view.

(Valve Shaft)

Figure 2A:
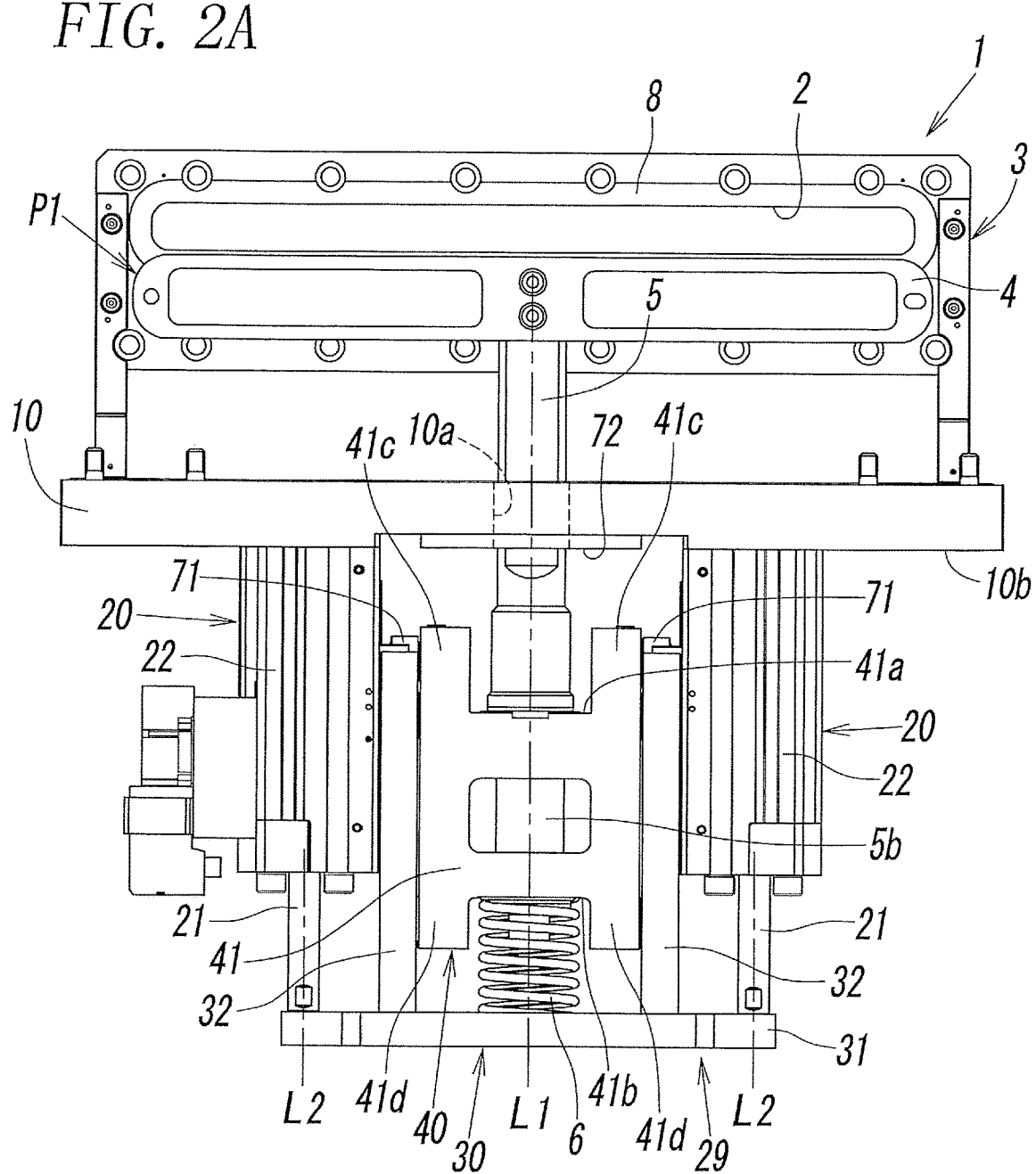
FIG. 2A is a diagram illustrating the backside of the gate valve in a state where the valve plate is located at the full open position, at which the gate opening is fully open.
Figure 2B:
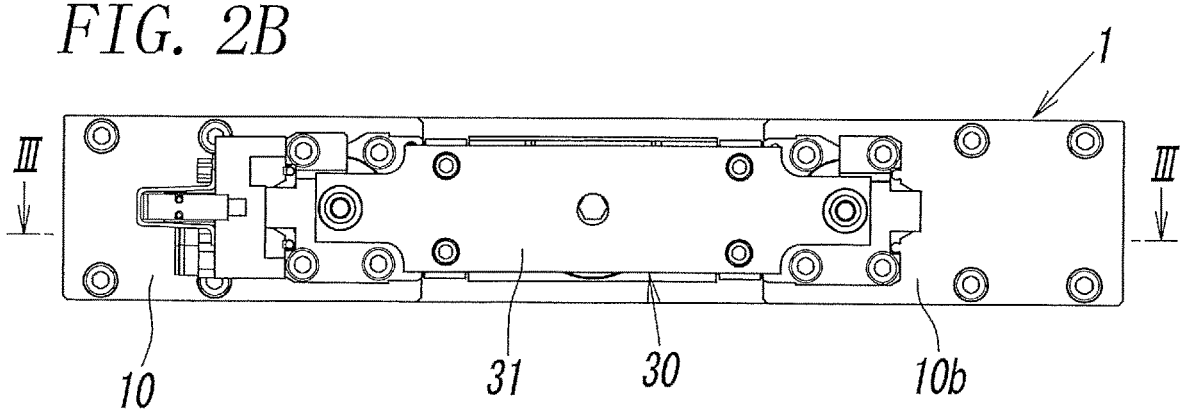

As illustrated in FIG. 1, FIG. 2A, and FIG. 2B, the valve shaft 5 is a bar-shaped member that is connected to a center portion of the lower surface of the valve plate 4 in the transverse direction and that extends downward. In a portion of the valve shaft 5 that extends below a lower surface 10b of the bonnet 10, an upper portion is covered with a bellows (not illustrated) that has a cylindrical shape and that expands and contracts along with movement of the valve shaft 5 in the vertical direction. An upper end of the bellows is hermetically connected to the lower surface 10b of the bonnet 10 so as to surround the through hole 10a, and a lower end of the bellows is hermetically connected to a second block 40 (a lever member 41, which will be described later). Note that, in the present embodiment, the upper side of the valve shaft 5 is formed so as to have a rectangular cross-sectional shape, and the lower side of the valve shaft 5 is formed so as to have a circular cross-sectional shape.

(Air Cylinder)

Figure 3:
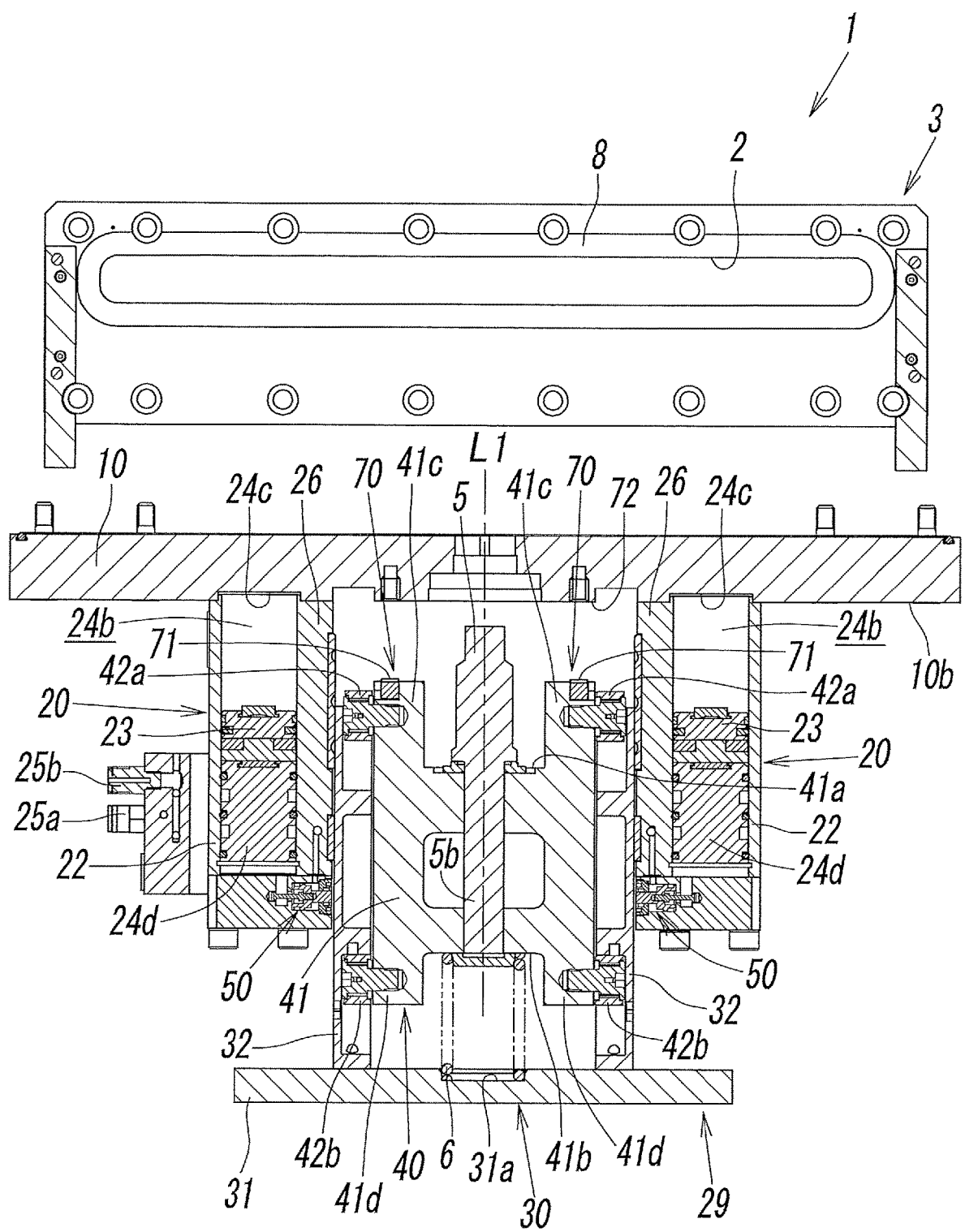
FIG. 3 is a longitudinal sectional view of the gate valve corresponding to a view taken along line III-III of FIG. 2B.

As illustrated in FIG. 2A and FIG. 3, the air cylinders 20 and 20 are arranged on the left and right sides, respectively, and face each other with the valve shaft 5 interposed therebetween. In the transverse direction, the air cylinders 20 are each disposed so as to face the outside of one of a pair of cam frames 32 and 32 that form a portion of a first block 30, which will be described later, and each of the air cylinders 20 includes a hollow cylinder housing 22 that extends in a direction (the vertical direction) that is perpendicular to the lower surface 10b of the bonnet 10 and that is fixed to the lower surface 10b, the drive rod 21 that is disposed in the cylinder housing 22 and that extends in the direction perpendicular to the bonnet 10 (the direction parallel to a surface of the valve sheet 8), and a drive piston 23 that is disposed in the cylinder housing 22 and fixed to an upper end portion of the drive rod 21 and that is capable of reciprocating as the drive rod 21 moves up and down.

Figure 4A:
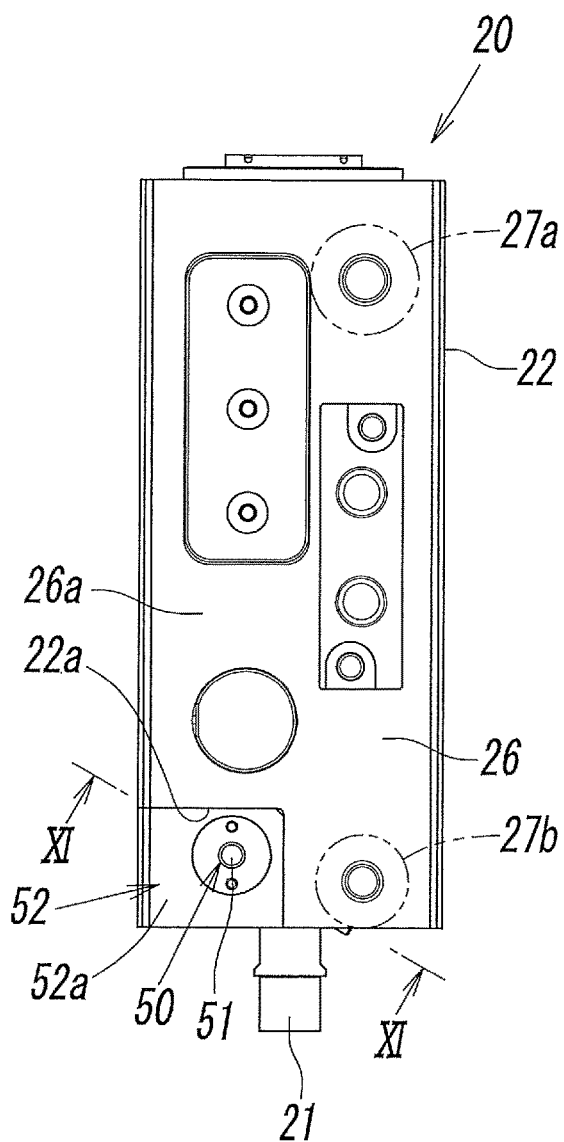
FIG. 4A is a right side view of one of the air cylinders.
Figure 4B:
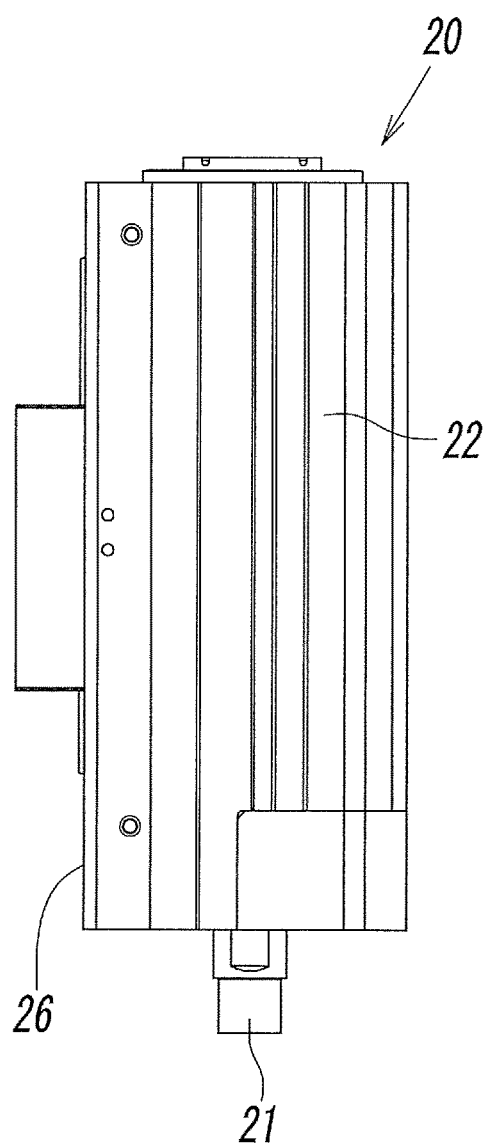
FIG. 4B is a back side view of the air cylinder.

In the present embodiment, as illustrated in FIG. 3, FIG. 4A, and FIG. 4B, side walls of the cylinder housings 22 that face their respective cam frames 32 included in the first block 30, which is connected to the air cylinders 20, also serve as facing walls (roller frames) 26 to which first guide rollers 27a and second guide rollers 27b, which will be described later, are attached. Thus, in the following description, the side walls of the cylinder housings 22 to which the first guide rollers 27a and the second guide rollers 27b are attached will be referred to as "roller frames 26". Note that, for example, the roller frames 26 can be formed independently of the cylinder housings 22 of the air cylinders 20 as long as each of the roller frames 26 has a fixed relationship with the corresponding cylinder housing 22.

Figure 9:
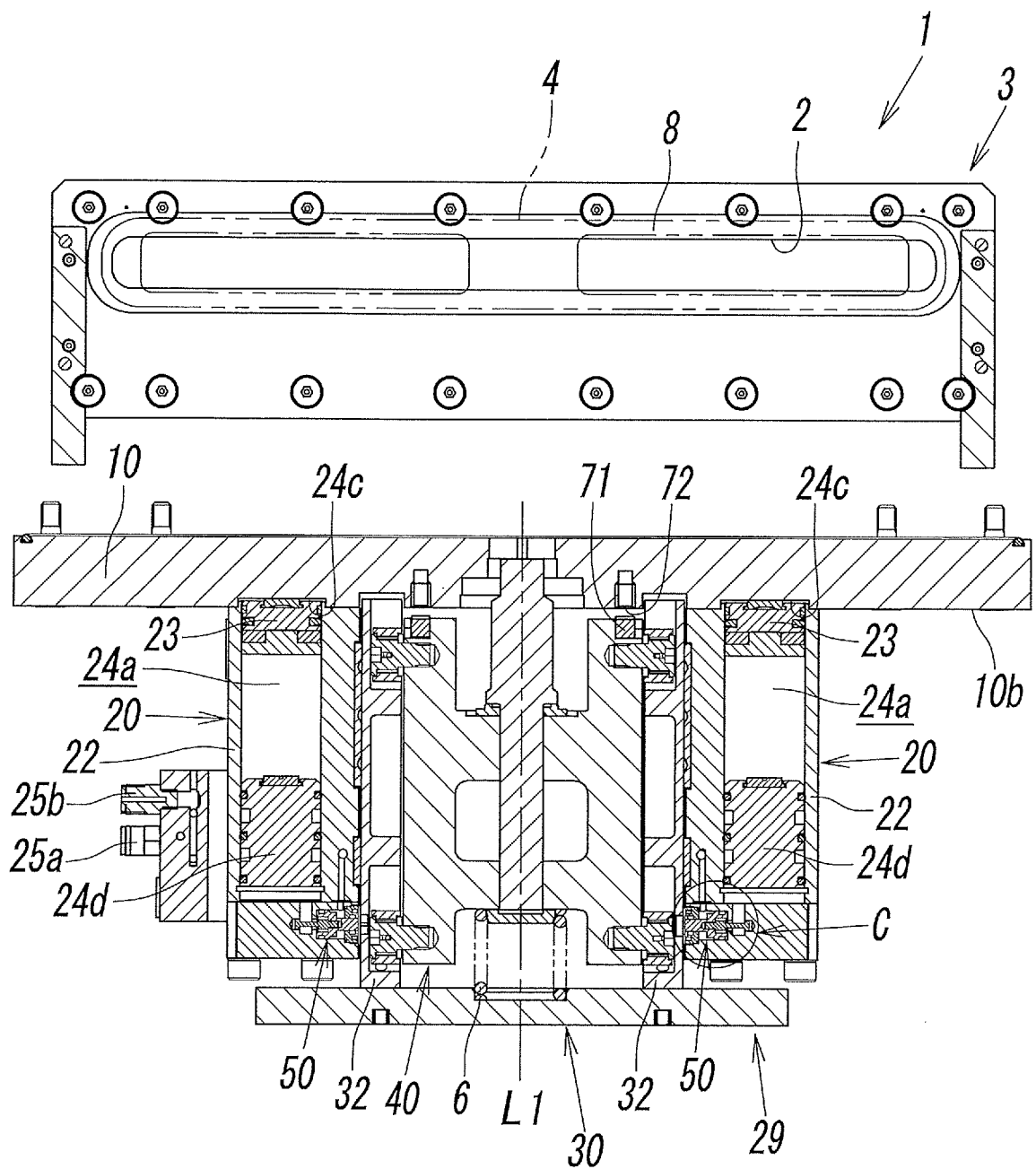
FIG. 9 is a longitudinal sectional view of the gate valve in a state where the air cylinders are each in a contracted state.

As illustrated in FIG. 3 and FIG. 9, in each of the cylinder housings 22, a rod-side (below the drive piston 23) first pressure chamber 24a and a head-side (above the drive piston 23) second pressure chamber 24b are formed on opposite sides of the drive piston 23 in the vertical direction. In addition, a collar member 24d that hermetically and slidably supports the drive rod 21 and with which a lower end portion of the drive piston 23 is brought into contact is hermetically fitted to a rod-side end portion of the cylinder housing 22. In contrast, a contact portion 24c that brings the drive piston 23 into contact with a retreating end of the drive rod 21 is provided at a head-side end portion of the cylinder housing 22.

A first port 25a for supplying and discharging compressed air to and from the first pressure chamber 24a and a second port 25b for supplying and discharging the compressed air to and from the second pressure chamber 24b are provided on the outer periphery of one of the cylinder housings 22. In the present embodiment, the first port 25a is positioned below the second port 25b. The first port 25a and the second port 25b are respectively connected to the first pressure chambers 24a and the second pressure chambers 24b through air supply/discharge flow paths that are formed in the cylinder housings 22 and the collar members 24d. Details of the air supply/discharge flow paths will be described later.

(Valve Moving Mechanism)

The valve moving mechanism 29 will now be specifically described. As illustrated in FIG. 2A, FIG. 2B and FIG. 3, the valve moving mechanism 29 includes the first block 30 that is fixed to the drive rods 21, the second block 40 that is fixed to the valve shaft 5, which extends from the valve casing 3, and a connecting member 6 that connects the second block 40 to the first block 30 such that the second block 40 is movable relative to the first block 30.

(First Block, Connecting Member)

In the present embodiment, the first block 30 includes a rod arm 31 that has a plate-like shape extending in the transverse direction and the left-and-right pair of cam frames 32 and 32 each of which is arranged between the second block 40 and one of the roller frames 26 and fixed to the upper surface of the rod arm 31. Lower end portions of the drive rods 21 and 21 are fixed to the rod arm 31 in such a manner that the drive rods 21 and 21 are located on the left and right sides, respectively, on the rod arm 31, and the cam frames 32 each have a plate-like shape extending upward in such a manner as to be parallel to an axis L2 of each of the drive rods 21. The rod arm 31 is disposed below the second block 40 and extends parallel to the bonnet 10. In addition, in a surface of the rod arm 31 that faces the second block 40, a center portion in the transverse direction has a recessed spring seat 31a that is formed so as to be recessed downward. A compression spring 6' that serves as the connecting member 6 is disposed between the spring seat 31a and the second block 40. The cam frames 32 will be described later.

(Second Block)

In the present embodiment, as illustrated in FIG. 2A and FIG. 3, the second block 40 is formed of the lever member 41 that is fixed to a lower portion 5b of the valve shaft 5. The lever member 41 is formed in a block shape that is substantially H-shaped when viewed from the rear surface and has a first recess 41a, a pair of first shoulder portions 41c, a second recess 41b, and a pair of second shoulder portions 41d. In an upper end surface of the lever member 41 that faces the bonnet 10, the first recess 41a is formed in a center portion so as to be recessed downward. The pair of first shoulder portions 41c are formed on the left and right sides of the first recess 41a, respectively, so as to form side walls of the first recess 41a. The second recess 41b is formed in a center portion of a lower end surface of the lever member 41 in the transverse direction so as to be recessed upward. The pair of second shoulder portions 41d are formed on the left and right sides of the second recess 41b, respectively, so as to form side walls of the second recess 41b.

The lever member 41 is fixed to the valve shaft 5 that extends between the first recess 41a and the second recess 41b in the vertical direction, and the lower end of the bellows, which is not illustrated and whose upper end is connected to the bonnet 10, is connected to the first recess 41a. In contrast, the upper end of the compression spring 6' whose lower end is fixed to the spring seat 31a of the rod arm 31 is fixed to the second recess 41b.

As described above, connecting the rod arm 31 of the first block 30 and the lever member 41 of the second block 40 to each other by the compression spring 6' enables the second block 40 to move with respect to the first block 30 in a direction in which the compression spring 6' expands and contracts, that is, the vertical direction in which the axis L1 of the valve shaft 5 extends and which is parallel to the surface of the valve sheet 8, and in a direction perpendicular to the vertical direction, that is, the longitudinal direction which is perpendicular to the surface of the valve sheet 8.

A stopper mechanism 70 is provided at an upper portion of the lever member 41. The stopper mechanism 70 includes stop rollers 71 that are arranged on surfaces of the pair of first shoulder portions 41c of the lever member 41, the surfaces facing the bonnet 10, and stop portions 72 that are provided at positions on the lower surface 10b of the bonnet 10, the positions facing the stop rollers 71. The stop rollers 71 are supported on their respective first shoulder portions 41c so as to be rotatable about a central axis that extends in a direction (the transverse direction) perpendicular to the surface of the valve sheet 8. The stop portions 72 hinder the lever member 41 from further moving along the axis L1 in a direction toward an end of the valve shaft 5 (upward) by coming into contact with their respective stop rollers 71 and allows the lever member 41 to move in the longitudinal direction by causing the stop rollers 71 to rotate and move in the longitudinal direction, which is perpendicular to the surface of the valve sheet 8.

(Cam Frame)

As illustrated in FIG. 1, FIG. 3, FIG. 5A, FIG. 5B, FIG. 5C, and FIG. 5D, each of the cam frames 32 is formed in a rectangular parallelepiped shape extending in the vertical direction and has an outer side surface 32a that faces the corresponding roller frame 26 and an inner side surface 32b that is opposite to the outer side surface 32a, and a plurality of recessed grooves are formed in the outer side surface 32a and the inner side surface 32b. In the present embodiment, In the outer side surface 32a of each of the cam frames 32, a guide groove 33 is formed on the rear side so as to contiguously extend between upper and lower end portions of the outer side surface 32a in the vertical direction and so as to have a predetermined width in the longitudinal direction. In addition, in the inner side surface 32b of each of the cam frames 32, a first cam groove 34a and a second cam groove 34b are formed in an upper portion and a lower portion of the inner side surface 32b, respectively, on the front side such that the first cam groove 34a and the second cam groove 34b each extend through the cam frame 32 in the transverse direction. Note that the first cam groove 34a and the second cam groove 34b do not need to extend through the cam frame 32 as in the present embodiment and may each be a recessed groove having a bottom on the side on which the second block 40 is present.

Each of the guide grooves 33 is formed so as to have a bottom wall 33c having a flat bottom surface. An upper portion of each of the guide grooves 33 is formed as a larger width portion 33a having a large width in the longitudinal direction and extending linearly in the vertical direction, and a lower portion of the guide groove 33 is formed as a smaller width portion 33b being connected to the lower end of the larger width portion 33a and extending linearly downward while having a width smaller than that of the larger width portion 33a. The larger width portion 33a and the smaller width portion 33b are coaxially connected to each other. In addition, each of the guide grooves 33 extends parallel to the axis L2 of the drive rods 21 (see FIG. 2A), and an upper end portion of the larger width portion 33a is open toward the bonnet 10.

Figure 5A:
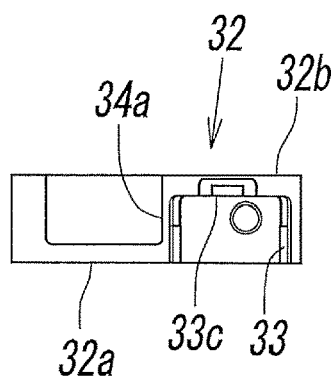
FIG. 5A is a plan view of one of the cam frames.
Figure 5B:
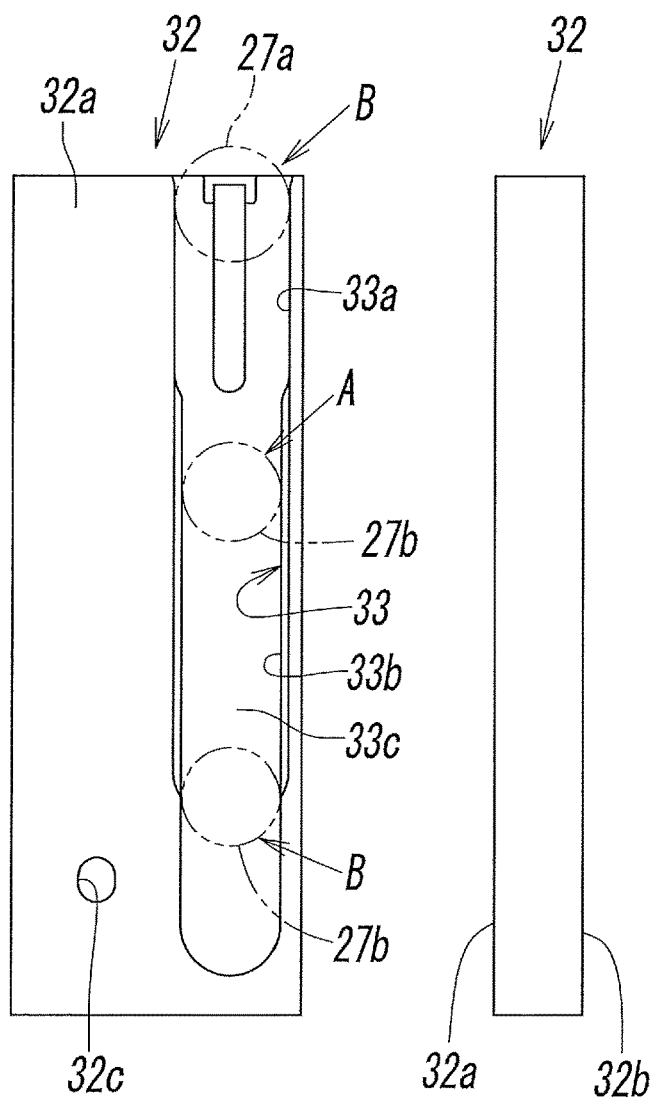
FIG. 5B is a side view of the cam frame.
Figure 5C:
FIG. 5C is a diagram illustrating the backside of the cam frame.

As illustrated in FIG. 4A and FIG. 5B, the first guide rollers 27a and the second guide rollers 27b are arranged at positions on the roller frames 26, the positions corresponding to the guide grooves 33, such that these rollers are fitted into the guide grooves 33 so as to be capable of freely sliding along the guide grooves 33. Each of the first guide rollers 27a is disposed on a rear upper portion of the corresponding roller frame 26, and each of the second guide rollers 27b is disposed on a rear lower portion of the corresponding roller frame 26. The first guide rollers 27a are fitted into the larger width portions 33a, and the second guide rollers 27b each having a diameter smaller than that of the corresponding first guide roller 27a are fitted into the smaller width portions 33b, so that the cam frames 32 are guided parallel to the surface of the valve sheet 8. Note that, in order to reduce rattling at the time of guiding the cam frames 32, it is desirable that the diameter of each of the first guide rollers 27a and the groove width of each of the larger width portions 33a be approximately equal to each other and that the diameter of each of the second guide rollers 27b and the groove width of each of the smaller width portions 33b be approximately equal to each other.

Figure 7:
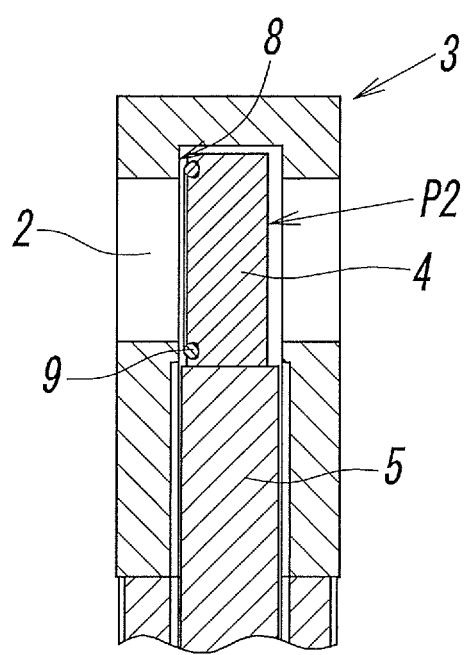
FIG. 7 is a partially enlarged cross-sectional view of the valve casing in a case where the valve plate is located at an intermediate position with respect to the gate opening.

In the valve moving mechanism 29, the guide grooves 33, the first guide rollers 27a, and the second guide rollers 27b form a translational motion mechanism that causes the valve plate 4 to perform a translational motion in the vertical direction between the full open position P1 illustrated in FIG. 1 and FIG. 6 and the intermediate position P2 illustrated in FIG. 7. As a result of the translational motion mechanism causing the first block 30 and the second block 40 to integrally move in the direction of the axis L1 of the valve shaft 5 without moving relative to each other, the valve plate 4 can move parallel to the surface of the valve sheet 8 without the sealing member 9 attached to the sealing surface 4a coming into contact with the inner surface of the valve casing 3.

Figure 5D:
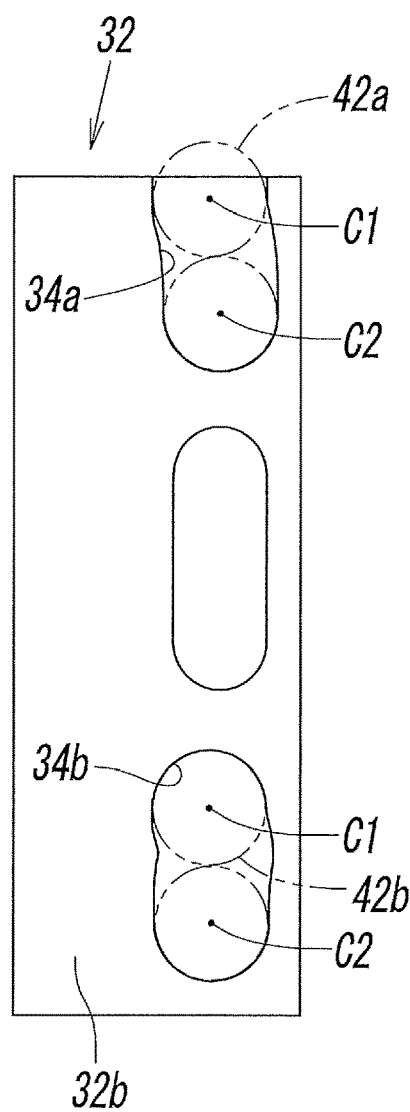
FIG. 5D is a left-hand side view the other cam frame.

In contrast, as illustrated in FIG. 3 and FIG. 5D, first cam rollers 42a and second cam rollers 42b that are provided on the second block 40 (the lever member 41) are fitted into the first cam grooves 34a and the second cam grooves 34b, respectively. The first cam grooves 34a are formed in front upper portions of the left-and-right pair of cam frames 32, and the second cam grooves 34b are formed in front lower portions of the cam frames 32. On the left and right side surfaces of the second block 40, the first cam rollers 42a are arranged at positions that correspond to the first cam grooves 34a, and the second cam rollers 42b are arranged at positions that correspond to the second cam grooves 34b. In the valve moving mechanism 29, the first cam grooves 34a and the second cam grooves 34b form, together with the first cam rollers 42a and the second cam rollers 42b, a vertical motion mechanism that causes the valve plate 4 to move between the intermediate position P2 illustrated in FIG. 7 and the hermetically closed position P3 illustrated in FIG. 8.

As a result of the vertical motion mechanism causing the valve plate 4 to move in a direction perpendicular to the surface of the valve sheet 8 such that the sealing member 9 is pressed against the valve sheet 8, the gate opening 2 can be hermetically closed, and the sealing member 9 can be separated from the valve sheet 8 such that the valve plate 4 is returned to the intermediate position P2. In addition, according to the vertical motion mechanism, the sealing member 9 and the valve sheet 8 can be brought into contact with each other with a uniform contact pressure, and generation of dust due to sliding movement of the sealing member 9 over the surface of the valve seat 8, occurrence of a sealing failure due to, for example, deterioration or twisting of the sealing member 9, and so forth can be prevented.

Figure 10:
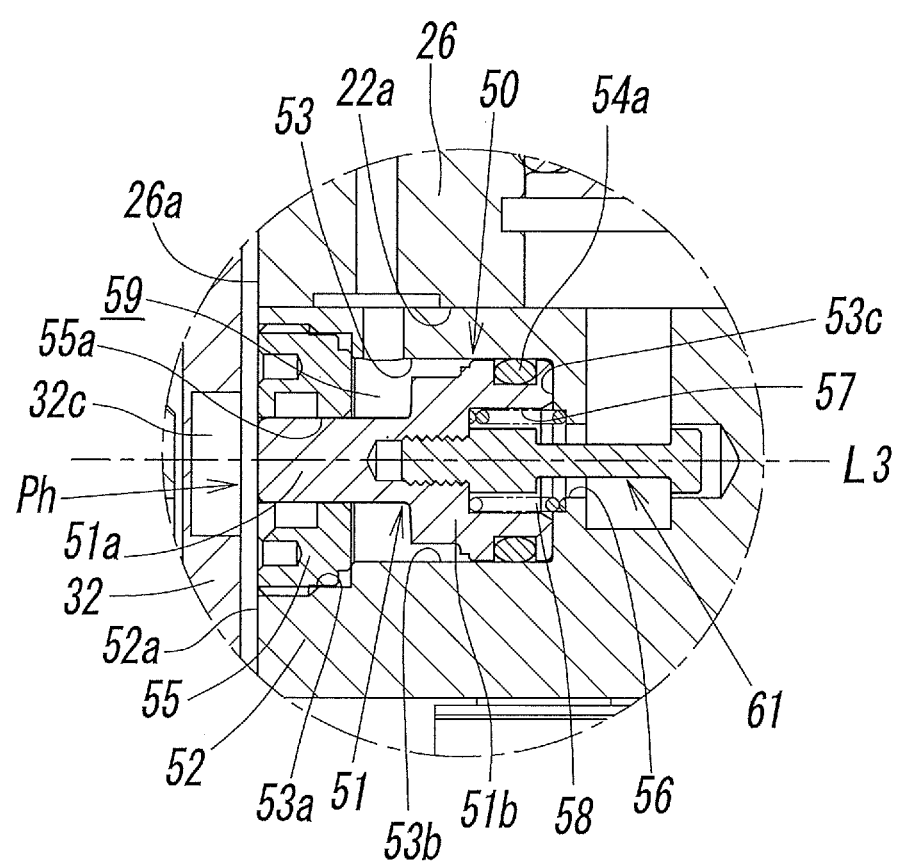
FIG. 10 is a partially enlarged cross-sectional view of a portion corresponding to a view in the direction of arrow C in FIG. 9.

The cam frames 32 have engagement holes 32c, and in a state where the valve plate 4 has moved to the hermetically closed position P3, lock pistons 51 of the locking mechanisms 50 (see FIG. 10), which will be described later, have advanced toward their respective cam frames 32 and are engaged in their respective engagement holes 32c. In the present embodiment, as illustrated in FIG. 1, FIG. 5B, and FIG. 10, the engagement holes 32c are formed in front lower portions of the outer side surfaces 32a of the cam frames 32.

The valve moving mechanism 29 will be described more specifically below.

As illustrated in FIG. 1 and FIG. 5D, each of the first cam grooves 34a is formed so as to be gradually inclined in a direction toward the surface of the valve sheet 8 (forward) from the upper side toward the lower side, and its upper end portion is open toward the bonnet 10.

When the valve plate 4 is located at the full open position P1 (see FIG. 1 and FIG. 6), and when the valve plate 4 is located at the intermediate position P2 (see FIG. 7), each of the first cam rollers 42a is located at a first position C1 in an upper region of the corresponding first cam groove 34a. When the valve plate 4 is located at the hermetically closed position P3 (see FIG. 8), each of the first cam rollers 42a is located at a second position C2 in a lower region of the corresponding first cam groove 34a.

In contrast, each of the second cam grooves 34b has a region that is formed on the side on which the rod arm 31 is present and gradually inclined in a direction toward the surface of the valve sheet 8 (forward) from the side on which the bonnet 10 is present (the upper side) toward the side on which the rod arm 31 is present (the lower side) and another region that extends in a direction parallel to the surface of the valve seat 8 or in a direction away from the valve seat 8 from the side on which the bonnet 10 is present (the upper side) toward the side on which the rod arm 31 is present (the lower side). These two regions are connected to each other in each of the second cam groove 34b.

Similar to the first cam grooves 34a, each of the second cam grooves 34b has the first position C1 and the second position C2, and the second cam rollers 42b are located at the first position C1 or the second position C2 at the same timing at which the first cam rollers 42a are fitted into their respective first cam grooves 34a.

Figure 8:
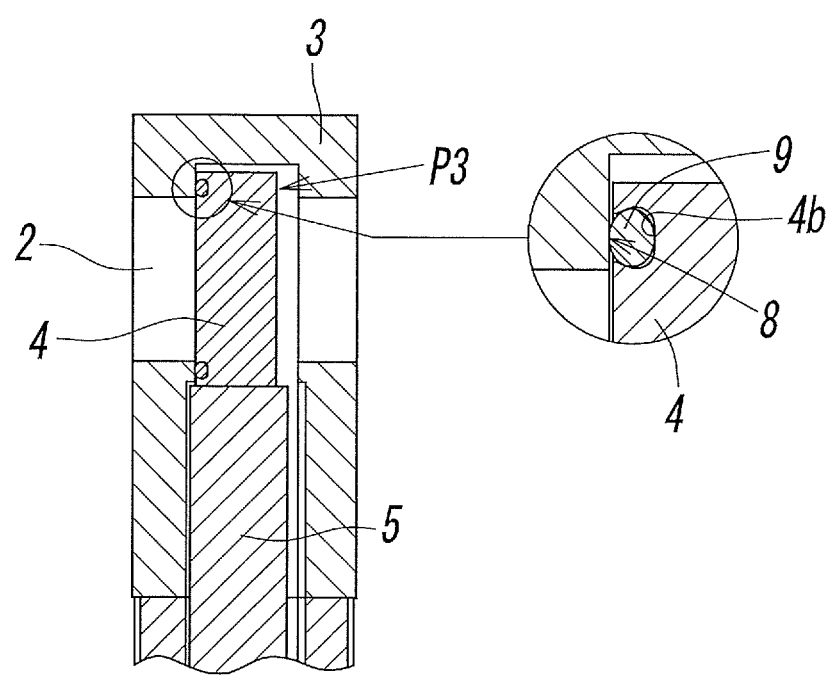
FIG. 8 is a partially enlarged cross-sectional view of the valve casing in a case where the valve plate is located at a hermetically closed position with respect to the gate opening.

In the gate valve 1 having such a configuration, as illustrated in FIG. 8 and FIG. 9, the position of the valve plate 4 is usually maintained at the hermetically closed position P3 by keeping the pressure in each of the first pressure chambers 24a of the air cylinders 20 constant. Thus, when the valve plate 4 is located at the hermetically closed position P3, if the pressure in each of the first pressure chambers 24a of the air cylinders 20 is lost for some reason, there is a possibility that the gate opening 2 will not be maintained in an appropriate hermetically closed state. Accordingly, the gate valve 1 of the present invention includes the locking mechanisms 50 for locking the valve plate 4 at the hermetically closed position P3.

(Locking Mechanism)

As illustrated in FIG. 4A, FIG. 9, and FIG. 10, the locking mechanisms 50 are provided in the cylinder housings 22 (the roller frames 26) of the air cylinders 20. The locking mechanisms 50 includes the lock pistons 51 that are provided in the roller frames 26, which face the cam frames 32 (the first block 30), so as to be capable of advancing and retreating with respect to their respective cam frames 32.

The lock pistons 51 are accommodated in accommodating units 52 that are provided in the roller frames 26.

In the present embodiment, each of the accommodating units 52 is detachably attached to one of cutout portions 22a that are formed in edge portions of front lower portions of the roller frames 26 by fastening means such as a bolt. Facing surfaces 52a of the accommodating units 52 that face the cam frames 32 are positioned on the same plane as facing surfaces 26a of the roller frames 26.

As illustrated in FIG. 10, the accommodating units 52 each have an accommodating hole 53 that is open to the facing surface 52a, that extends toward the inside of the cylinder housing 22, and that has a cylindrical shape with a bottom. Each of the lock pistons 51 in accommodated in the corresponding accommodating holes 53. In each of the accommodating holes 53, a larger-diameter hole 53a and a smaller-diameter hole 53b are contiguously formed in a direction that is perpendicular to the axis L2 (see FIG. 2A) of the air cylinders 20 (leftward) from the side on which the corresponding facing surface 52a is present, the smaller-diameter hole 53b having a smaller diameter than the larger-diameter hole 53a. The larger-diameter hole 53a and the smaller-diameter hole 53b are formed so as to be coaxial with each other, and a movement restricting member 55 that restricts movement of the corresponding lock piston 51 toward an advancing side in an advancing/retreating direction of the lock piston 51 (a distal end side) is fitted into the larger-diameter hole 53a. A center portion of the movement restricting member 55 in the radial direction of the movement restricting member 55 has a through hole 55a that is formed so as to extend through the movement restricting member 55 in the advancing/retreating direction of the lock piston 51. A shaft portion 51a of the lock piston 51 on the distal end side is movably inserted into the through hole 55a.

The bottom surfaces of the accommodating holes 53 each have an annular stopper surface 53c that is formed in such a manner as to project inward in a radial direction. An end portion of each of the lock pistons 51 on a retreating side in the advancing/retreating direction of the lock piston 51 (a proximal end side) comes into contact with the corresponding stopper surface 53c, so that movement of the lock piston 51 toward the retreating side in the advancing/retreating direction is restricted. A center portion of each of the stopper surfaces 53c has a guide hole 56 that is formed so as to extend leftward. Each of the guide holes 56 has a cylindrical shape with a bottom and extends coaxially with the corresponding accommodating hole 53. The inner diameter of each of the guide holes 56 is smaller than the inner diameter of the corresponding smaller-diameter hole 53b. Target members 61 to be detected are each connected to one of the lock pistons 51 and inserted in one of the guide holes 56 so as to be capable of advancing and retreating. Details of the target members 61 will be described later.

As illustrated in FIG. 10, in each of the lock pistons 51, the shaft portion 51a that has a columnar shape is formed on the distal end side along an axis L3, and a piston main-body portion 51b that has a columnar shape having a diameter larger than that of the shaft portion 51a is formed on the proximal end side. The distal end of the piston main-body portion 51b is connected to the proximal end of the shaft portion 51a, and the shaft portion 51a and the piston main-body portion 51b are formed coaxially with each other.

Each of the shaft portions 51a has a length with which an end portion of the shaft portion 51a projects from the facing surface 52a of the accommodating units 52 when the distal end portion of the piston main-body portion 51b comes into contact with the proximal end portion of the movement restricting member 55 and with which the end portion of the shaft portion 51a is located on substantially the same plane as the facing surface 52a of the accommodating units 52 when the proximal end portion of the piston main-body portion 51b comes into contact with the stopper surface 53c of the accommodating hole 53. In other words, each of the lock piston 51 is capable of moving between a locking position Pr (see FIG. 11B) at which the piston main-body portion 51b is in contact with the movement restricting member 55 and at which the end portion of the shaft portion 51a projects toward the cam frame 32 and a non-locking position Ph (see FIG. 11A) at which the piston main-body portion 51b is in contact with the bottom surface of the accommodating hole 53 and at which the end portion of the shaft portion 51a is located on substantially the same plane as the facing surface 52a of the accommodating unit 52.

As illustrated in FIG. 10, spring recesses 57 are formed in center portions of proximal end surfaces of the piston main-body portions 51b in a radial direction such that each of the spring recesses 57 has a cylindrical shape with a bottom and is recessed toward the distal end side. In each of the spring recesses 57, an urging spring 58 that urges the corresponding lock piston 51 toward the distal end side along the axis L3 is accommodated. In the present embodiment, each of the urging springs 58 is, for example, a compression-coil spring and is accommodated in the corresponding spring recess 57 in a state where a distal end portion of the urging spring 58 is in contact with the bottom surface of the spring recess 57 and where a proximal end portion of the urging spring 58 is in contact with the bottom surface of the accommodating hole 53. Each of the urging springs 58 is formed so as to urge the corresponding lock piston 51 toward the corresponding cam frame 32 even in a state where the lock piston 51 has moved to the locking position Pr (see FIG. 11B).

Each of the piston main-body portions 51b is formed such that the outer diameter thereof on the proximal end side is larger than the outer diameter thereof on the distal end side, and a recess is formed in the outer periphery of a portion thereof having the larger outer diameter so as to be recessed inward in the radial direction and so as to have a ring-like shape. An O-ring 54a is placed in each of the recesses. The O-ring 54a hermetically supports the piston main-body portion 51b with respect to the corresponding accommodating hole 53 such that the piston main-body portion 51b is slidable in the direction of the axis L3. An unlocking pressure chamber 59 for causing one of the lock pistons 51 to retreat is formed on the advancing side of each of the lock pistons 51 in the advancing/retreating direction. In other words, the unlocking pressure chamber 59 is formed between the advancing side of the lock piston 51 in the advancing/retreating direction and the corresponding accommodating hole 53. Each of the unlocking pressure chambers 59 communicates with a lock air flow path 80 (see FIG. 13) that is connected to the first port 25a, through which the compressed air is supplied to the second pressure chambers 24b of the air cylinders 20. Operation of each of the locking mechanisms 50 will be described later.

Even in the case where the locking mechanisms 50 each having such a configuration are included in the gate valve 1, if the urging springs 58 break, there is a possibility that the lock pistons 51 cannot be engaged in the engagement holes 32c. Consequently, the valve plate 4 may become movable and may sometimes not be able to hermetically close the chamber through the gate opening 2. In this case, since the urging springs 58 are disposed in the accommodating units 52, it is difficult to determine whether the locking mechanisms 50 are engaged in the engagement holes 32c. Accordingly, the gate valve 1 according to the present embodiment includes the lock detection units 60 capable of determining whether the locking mechanisms 50 are engaged in the engagement holes 32c.

(Lock Detection Unit)

Figure 11A:
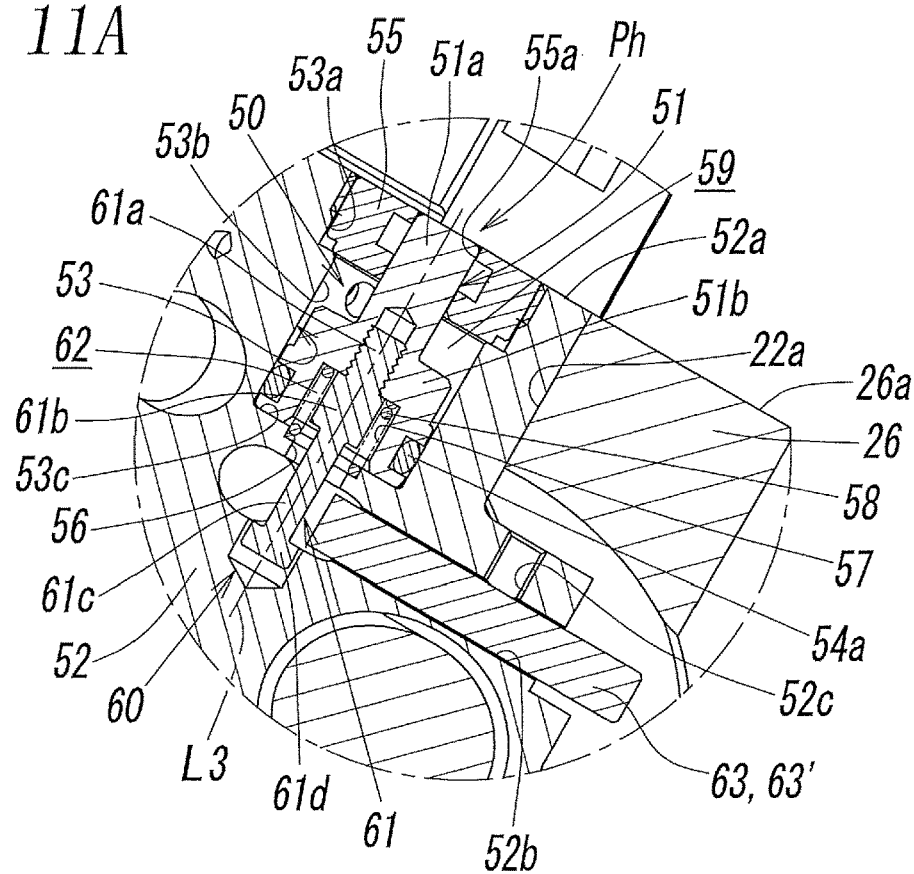
FIG. 11A is an enlarged cross-sectional view of one of locking mechanisms and a corresponding one of lock detection units corresponding to a view taken along line XI-XI of FIG. 4A.
Figure 11B:
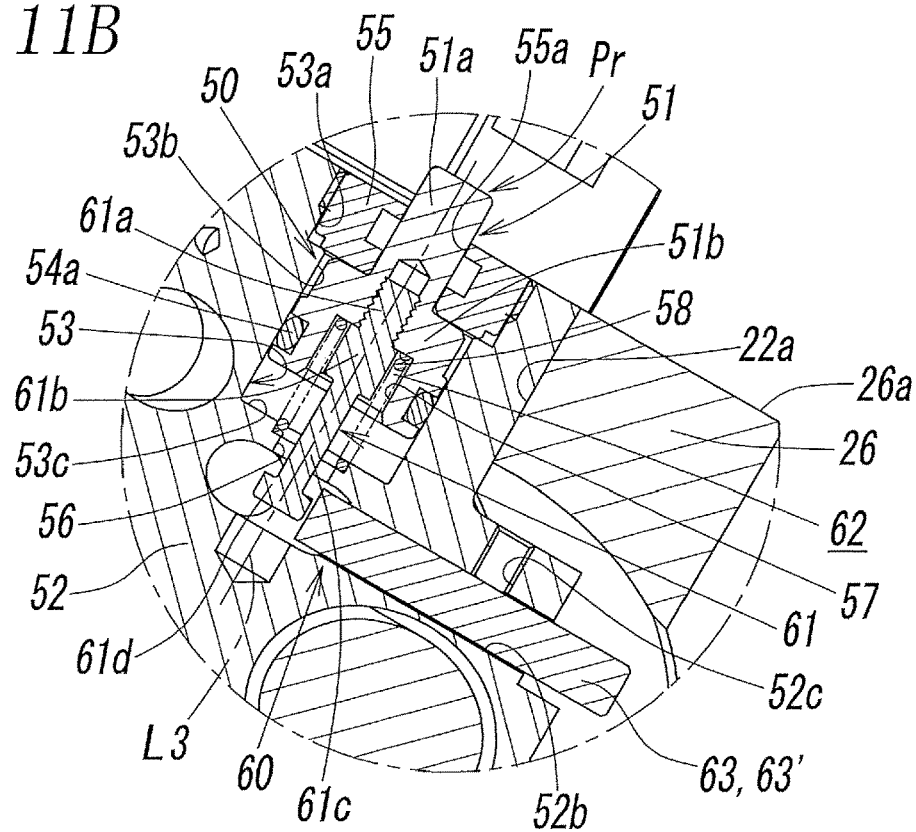
FIG. 11B is an enlarged cross-sectional view of the locking mechanism and the lock detection unit in a state where a lock piston has moved to a locking position.

As illustrated in FIG. 11A and FIG. 11B, each of the lock detection units 60 includes the target member 61 that is provided at the proximal end portion of the lock piston 51 and that extends in the guide hole 56 and a detection main-body portion 63 that is capable of detecting the target member 61 when the lock piston 51 is engaged in the engagement hole 32c. Each of the target members 61 is made of a magnetic metal material and formed in a columnar shape.

As described above, the detection main-body portions 63 detect the target members 61 connected to the lock pistons 51 when the lock pistons 51 are engaged in the engagement holes 32c, so that the detection main-body portions 63 do not need to directly detect the lock pistons 51. Therefore, the degree of freedom in the positions of the detection main-body portions 63 with respect to the lock pistons 51 can be increased.

In the present embodiment, each of the target members 61 extends coaxially with the corresponding lock piston 51 and is connected to the lock piston 51 on the distal end side thereof, and each of the target members 61 includes a threaded portion 61a, a connecting portion 61b, a smaller-diameter portion 61c, and a larger-diameter portion 61d that are arranged in this order from the distal end side toward the proximal end side. The threaded portion 61a is formed in a columnar shape and has an external thread portion formed on the outer peripheral surface thereof. The threaded portion 61a is screwed in an internal thread portion that is formed in the bottom surface of the spring recess 57 of the lock piston 51. The connecting portion 61b is connected to a proximal end portion of the threaded portion 61a and formed in a columnar shape having a diameter larger than that of the threaded portion 61a. The outer diameter of connecting portion 61b is smaller than the inner diameter of the spring recess 57 and is larger than the inner diameter of the internal thread portion.

Thus, when a distal end portion of the connecting portion 61b is brought into contact with the bottom surface of the spring recess 57 in a state where the threaded portion 61a is screwed in the internal thread portion of the lock piston 51, the target member 61 can be positioned with respect to the lock piston 51 in the axial direction of the lock piston 51. In addition, a space 62 that is capable of accommodating the urging spring 58 is defined between the outer surface of the connecting portion 61b and the inner surface of the spring recess 57, and the urging spring 58 is accommodated in the space 62. Furthermore, the outer diameter of the connecting portion 61b is smaller than the inner diameter of the urging spring 58. Thus, the connecting portion 61b can be inserted into a space enclosed by the urging spring 58 in the direction of the axis L3.

The smaller-diameter portion 61c extends from a proximal end portion of the connecting portion 61b into the guide hole 56 and has an outer diameter smaller than the inner diameter of the guide hole 56. Thus, it is unlikely that the smaller-diameter portion 61c will come into contact with the inner surface of the guide hole 56 as the lock piston 51 advances and retreats.

The larger-diameter portion 61d is connected to a proximal end portion of the smaller-diameter portion 61c, and the larger-diameter portion 61d has a diameter larger than that of the smaller-diameter portion 61c and has an outer diameter slightly smaller than the inner diameter of the guide hole 56. Thus, the larger-diameter portion 61d is movable in the guide hole 56 as the lock piston 51 advances and retreats. The larger-diameter portion 61d is detected by the detection main-body portion 63 when the lock piston 51 moves into the engagement hole 32c. Note that, although the target member 61 is formed in a columnar shape, the shape of the target member 61 is not limited to this, and the smaller-diameter portion 61c and the larger-diameter portion 61d may each be formed in a rectangular shape in a cross-sectional view and in a rectangular parallelepiped shape in the direction of the axis L3.

(Detection Main-Body Portion)

In the present embodiment, as illustrated in FIG. 11A and FIG. 11B, although each of the detection main-body portions 63 is, for example, an inductive proximity sensor 63', each of the detection main-body portions 63 may be capable of detecting the larger-diameter portion 61d of the target member 61 to be detected by a different detection method (e.g., a capacitance proximity sensor or a magnetic proximity sensor). Each of the proximity sensors 63' is formed so as to have a columnar external shape and disposed in a direction perpendicular to the corresponding target member 61. Each of the proximity sensors 63' is placed in a placement hole 52b that is formed in the corresponding accommodating unit 52.

The placement hole 52b extends in a direction perpendicular to the guide hole 56 in which the target member 61 is inserted. In the longitudinal direction of the placement hole 52b, one end of the placement hole 52b is open, and the other end of the placement hole 52b extends to a position beyond the guide hole 56. The inner diameter of the placement hole 52b is slightly larger than the outer diameter of the proximity sensor 63'. The length of the placement hole 52b in the longitudinal direction is shorter than that of the proximity sensor 63'. Thus, when the proximity sensor 63' is inserted through the opening of the placement hole 52b, the proximity sensor 63' can be placed in the placement hole 52b in a state where the proximal end side of the proximity sensor 63' projects from the opening of the placement hole 52b.

In a state where the proximity sensor 63' is inserted in the placement hole 52b, there is a space around a distal end portion of the proximity sensor 63'. Consequently, the distal end side of the proximity sensor 63' is not covered with the accommodating unit 52, and a probability that the range of a magnetic field generated by the distal end of the proximity sensor 63' will become narrow can be reduced. Therefore, the sensitivity of the proximity sensor 63' can be improved.

A threaded hole portion 52c for a setscrew is formed at an intermediate portion of the placement hole 52b in the longitudinal direction so as to extend in a direction perpendicular to the placement hole 52b. Accordingly, by screwing a setscrew, which is not illustrated, into the threaded hole portion 52c in a state where the proximity sensor 63' is inserted in the placement hole 52b, the proximity sensor 63' can be fixed in the placement hole 52b.

Each of the proximity sensors 63' of the present exemplary embodiment is configured to output a detection signal indicating that the proximity sensor 63' has detected the corresponding larger-diameter portion 61d when the larger-diameter portion 61d comes close to a position where a small space is formed with respect to the other end (distal end) of the proximity sensor 63' in the longitudinal direction and is configured not to output the detection signal when the corresponding smaller-diameter portion 61c comes close to the distal end of the proximity sensor 63'. Accordingly, when the larger-diameter portion 61d comes close to the distal end of the proximity sensor 63' at the same time as the lock piston 51 moves into the engagement hole 32c, the proximity sensor 63' outputs the detection signal, and thus, the lock piston 51 can be determined to be in a state of being engaged in the engagement hole 32c. In addition, when the detection signal is not output by the proximity sensor 63', the lock piston 51 can be determined not to be in a state of being engaged in the engagement hole 32c.

As described above, each of the target members 61 includes the smaller-diameter portion 61c and the larger-diameter portion 61d, and each of the proximity sensors 63' detects the corresponding larger-diameter portion 61d when the corresponding lock piston 51 is engaged in the corresponding engagement hole 32c and does not detect the larger-diameter portion 61d when the lock piston 51 is not engaged in the engagement hole 32c. Thus, the proximity sensor 63' can detect whether the lock piston 51 is in a state of being engaged in the engagement hole 32c with a simple configuration.

In addition, since the detection main-body portions 63 detect their respective target members 61 connected to the corresponding lock pistons 51 when the lock pistons 51 are engaged in the engagement holes 32c, the detection main-body portions 63 do not need to directly detect the lock pistons 51. Therefore, the degree of freedom in the positions of the detection main-body portions 63 with respect to the lock pistons 51 can be increased.

Figure 12:
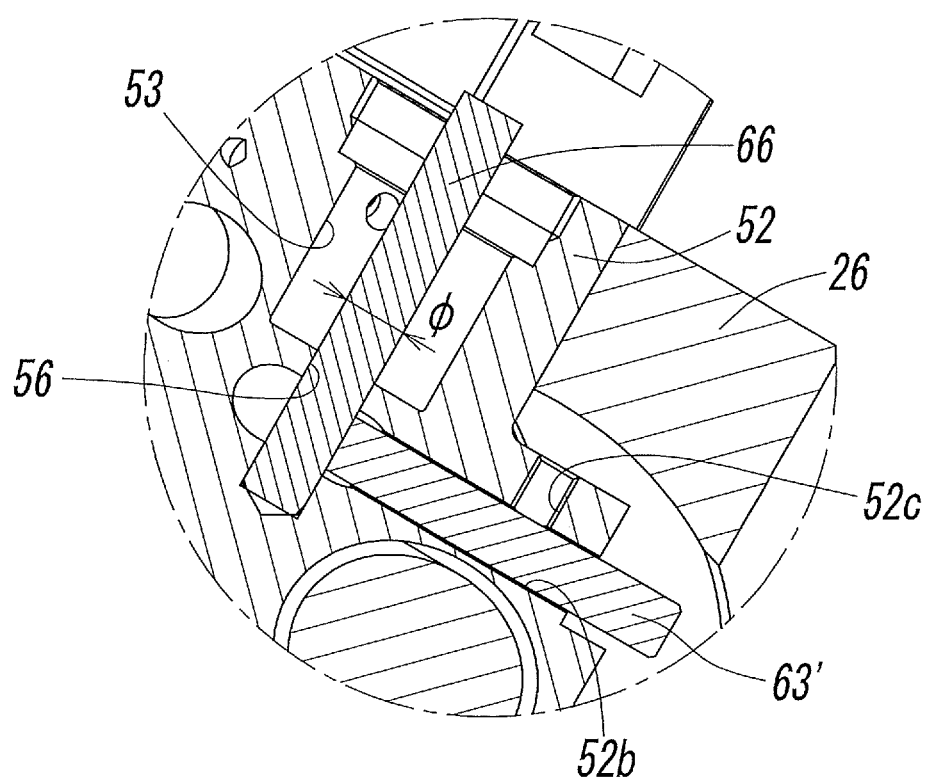
FIG. 12 is an enlarged cross-sectional view illustrating adjustment of each of the lock detection units.

Note that there is a possibility that each of the proximity sensors 63' will not output the detection signal when the gap between the proximity sensor 63' and the corresponding larger-diameter portion 61d becomes larger than a predetermined value. Thus, the gap between the distal end of each of the proximity sensors 63' and the corresponding larger-diameter portion 61d needs to be set to the predetermined value. Accordingly, as illustrated in FIG. 12, the lock piston 51 and the urging spring 58 are removed from each of the accommodating holes 53, and a position adjustment pin 66 is inserted into each of the guide hole 56. The diameter φ of the position adjustment pin 66 has a value that is obtained by doubling a radius obtained by adding the above-mentioned gap to the radius of each of the larger-diameter portions 61d of the target members 61.

Then, the position adjustment pins 66 are inserted into the guide holes 56, and the proximity sensors 63' are inserted into the placement holes 52b such that the distal ends of the proximity sensors 63' are each brought into contact with a side surface of the corresponding position adjustment pin 66, so that positioning of the proximity sensors 63' with respect to the placement holes 52b in the axial direction can be performed. Subsequently, in a state where the proximity sensors 63' are in contact with the position adjustment pins 66, the proximity sensors 63' are fixed into the placement holes 52b by using a setscrew, which is not illustrated, so that each of the proximity sensors 63' can be fixed in place at a predetermined position in the corresponding placement hole 52b.

In addition, since the lock pistons 51, the target members 61, and the proximity sensors 63' are arranged in the accommodating units 52 that are attachable and detachable to and from the cylinder housings 22, the accommodating units 52 can be removed from the cylinder housings 22 for adjustment of the positions of the proximity sensors 63'. In the case where one of the urging springs 58, one of the proximity sensors 63', or the like breaks, the broken urging spring 58 or the broken proximity sensor 63' may be removed from the corresponding accommodating unit 52 and replaced. Thus, an increase in the manufacturing costs can be suppressed.

As described above, the proximity sensors 63' are each an inductive proximity sensor. In this case, the accommodating units 52 may be made of a non-magnetic material, and the target members 61 may be made of a magnetic material that has electrical conductivity. By using a non-magnetic material for the accommodating units 52, a probability that a magnetic field generated by each of the proximity sensors 63' will pass through the corresponding accommodating unit 52 can be reduced, and a decrease in the intensity of magnetic fields that pass through the target members 61 can be suppressed. In addition, by using a magnetic material having electrical conductivity for the target member 61, the amount of an eddy current generated in each of the larger-diameter portions 61d of the target members 61 can be increased. As a result, the amount of heat generated from the eddy current increases, and the sensitivity of each of the inductive proximity sensors 63' can be further improved.

Next, a flow path of the compressed air when the valve plate 4 moves from the hermetically closed position P3 toward the full open position P1 and a flow path of the compressed air when the valve plate 4 moves from the side of the full open position P1 toward the hermetically closed position P3 will be schematically described.

Figure 13:
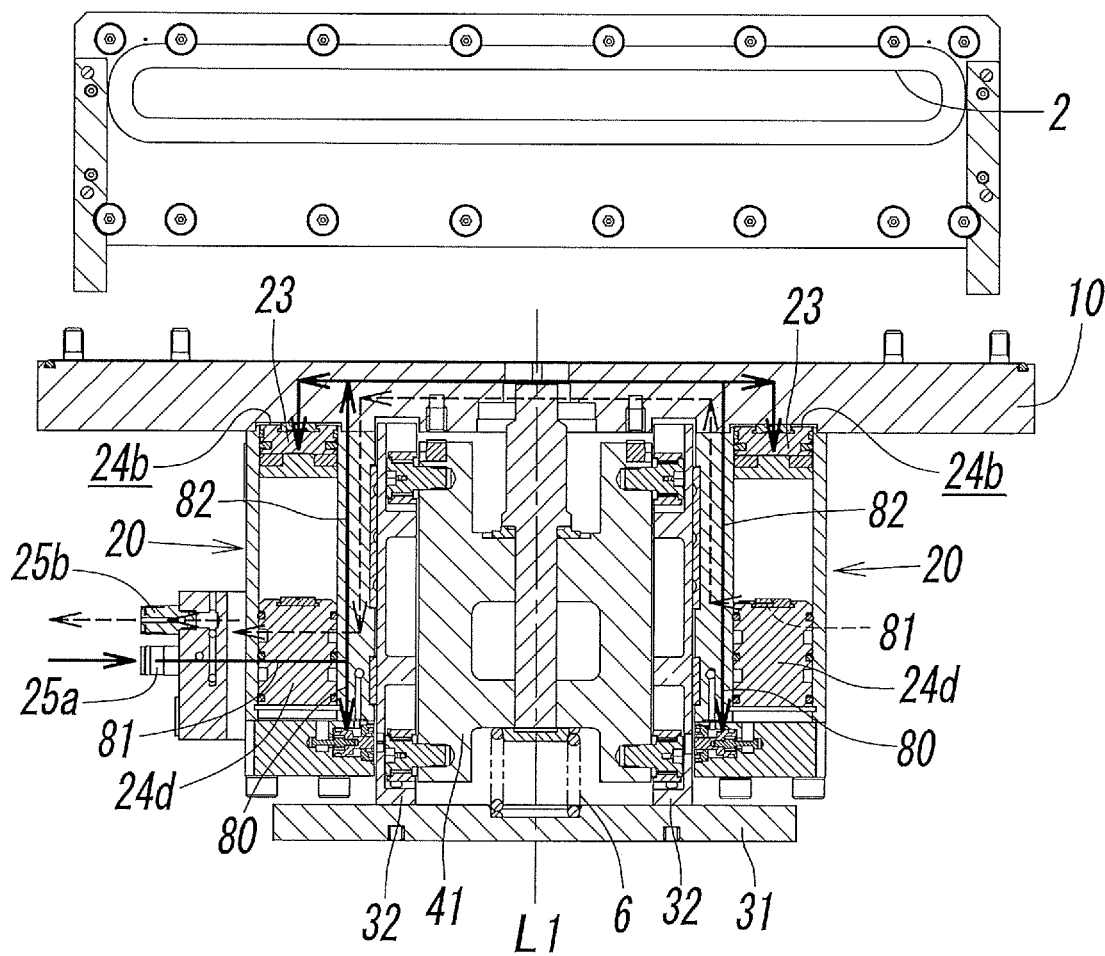
FIG. 13 is a diagram schematically illustrating a flow path of compressed air when the valve plate is moved from the hermetically closed position toward the full open position.

As described above, the first port 25a is used for supplying and discharging the compressed air to and from the head-side second pressure chambers 24b of the air cylinders 20 as illustrated in FIG. 13 and connected to an annular flow path 81 that is partitioned by a recessed groove formed in the outer periphery of one of the collar members 24d and the inner peripheral surface of one of the cylinder housings 22. In addition, the annular flow path 81 is connected to one of the second pressure chambers 24b through an air supply/discharge flow path 82 that is formed in the cylinder housing 22.

Furthermore, the annular flow path 81 is connected to the lock air flow path 80 that is formed in the cylinder housing 22 for supplying and discharging the compressed air to and from one of the unlocking pressure chambers 59 (see FIG. 11A). The air supply/discharge flow path 82 further extends in the bonnet 10 and is connected to another air supply/discharge flow path 82 that is formed in the cylinder housing 22 of the other air cylinder 20.

Figure 14:
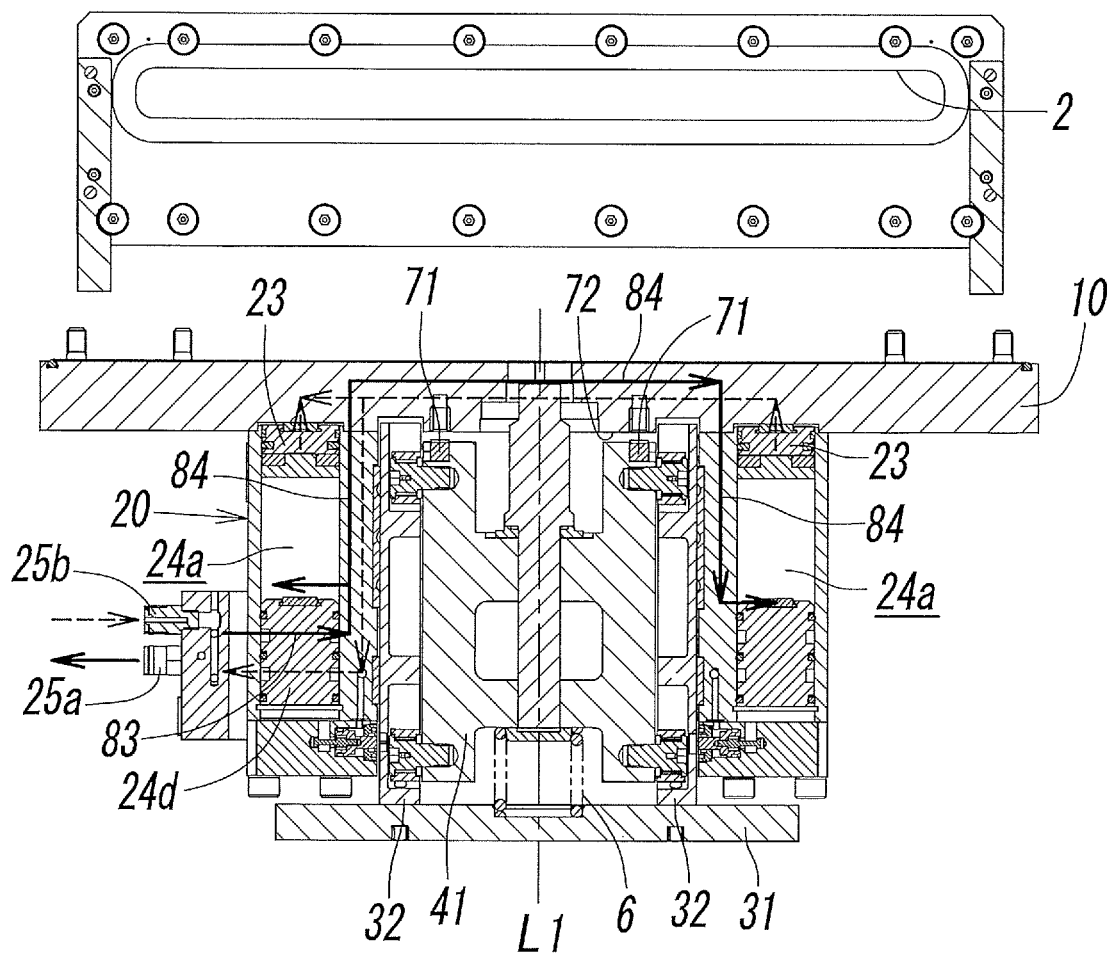
FIG. 14 is a diagram schematically illustrating a flow path of the compressed air when the valve plate is moved from the full open position toward the hermetically closed position.

In contrast, as illustrated in FIG. 14, the second port 25b is used for supplying and discharging the compressed air to and from the rod-side first pressure chambers 24a of the air cylinders 20 and connected to an annular flow path 83 that is partitioned by a recessed groove formed in the outer periphery of one of the collar members 24d and the inner peripheral surface of one of the cylinder housings 22. In addition, the annular flow path 83 is connected to the first pressure chambers 24a through air supply/discharge flow paths 84 that are formed in each cylinder housings 22. Note that the pressure chambers each of which is opposite to one of the unlocking pressure chambers 59 of the locking mechanisms 50 are opened under atmospheric pressure through a communication path, which is not illustrated.

Accordingly, when the compressed air is supplied to the first port 25a, as illustrated in FIG. 13, the lock pistons 51 move in the retreating direction such that the valve plate 4 is unlocked, and the air cylinders 20 expand. In contrast, when the compressed air is supplied to the second port 25b, as illustrated in FIG. 14, supply of the compressed air to the unlocking pressure chambers 59 is stopped, and the lock pistons 51 are brought into contact with the inner side surfaces 32b of the cam frames 32 by the urging springs 58. Thus, the air cylinders 20 contract.

The basic operation of the gate valve 1 will now be specifically described.

First, as illustrated in FIG. 13, the compressed air is supplied to the second pressure chambers 24b through the first port 25a of one of the air cylinders 20, and the compressed air in the first pressure chambers 24a is discharged through the second port 25b, so that the drive rods 21 (see FIG. 2A) expand along with movement of the drive pistons 23 toward the rod side (the lower side). In response to the drive pistons 23 coming into contact with the collar members 24d, as illustrated in FIG. 1 and FIG. 2A, the first block 30 (the rod arm 31 and the cam frames 32) and the second block 40 (the lever member 41) move to a lower position farthest from the valve casing 3 and the bonnet 10. Along with this, the valve plate 4 moves to the full open position P1 at which the valve plate 4 is completely retreated from the gate opening 2 in the direction in which the axis L1 of the valve shaft 5 extends, and a passage is formed between the gate opening 2 and the rear-surface-side opening 2a (see FIG. 6). As a result, a workpiece can be inserted into and removed from the chamber through the passage.

In this case, as illustrated in FIG. 5B and FIG. 5D, only the second guide rollers 27b indicated by arrow A are fitted in the guide grooves 33 of the cam frames 32, and the other first guide rollers 27a have not yet been fitted in the guide grooves 33. In addition, each of the first cam rollers 42a moves to the first position C1 in the corresponding first cam groove 34a, and each of the second cam rollers 42b moves to the first position C1 in the corresponding second cam groove 34b.

Next, as illustrated in FIG. 14, the compressed air is supplied to the first pressure chambers 24a through the second port 25b of the air cylinder 20, and the compressed air in the second pressure chamber 24b is discharged through the first port 25a, so that the drive pistons 23 move in a direction toward the head side (upward), and the drive rods 21 contract along the axis L2 thereof toward the inside of their respective cylinder housings 22. At the same time, the rod arm 31, the cam frames 32, and the lever member 41 integrally move in the same direction as that in which the drive rods 21 move (upward in the direction of the axis L1 of the valve shaft 5) without moving relative to one another due to deformation (such as expansion and contraction or bending) of the compression springs 6'.

Along with this, as illustrated in FIG. 7 and FIG. 14, the valve plate 4 moves toward the gate opening 2 along the axis L1 of the valve shaft 5. During this movement, the valve plate 4 moves parallel to the surface of the valve sheet 8. Then, when the movement of the lever member 41 in the direction of the axis L1 is stopped as a result of the stop rollers 71 of the lever member 41 coming into contact with the stop portions 72 of the lower surface 10b of the bonnet 10, the valve plate 4 moves to the intermediate position P2 at which the valve plate 4 faces the gate opening 2 with a distance therebetween (i.e., the sealing member 9 faces the valve sheet 8 with a distance therebetween), and the movement of the valve plate 4 parallel to the surface of the valve sheet 8 is stopped.

Note that, in this case, as illustrated in FIG. 5B, the first guide rollers 27a and the second guide rollers 27b that are indicated by arrows B are both fitted in the guide grooves 33 of the cam frames 32. In addition, each of the first cam rollers 42a is still located at the first position C1 in the corresponding first cam groove 34a, and each of the second cam rollers 42b is still located at the first position C1 in the corresponding second cam groove 34b.

Then, as illustrated in FIG. 14, when the drive pistons 23 are moved in the direction toward the head side (upward) by further supplying the compressed air to the first pressure chambers 24a of the air cylinders 20, and the drive rods 21 (see FIG. 2B) are caused to contract to a further extent, since movement of the second block 40, which is formed of the lever member 41, in the direction of the axis L1 (upward) is restricted by the stopper mechanism 70 (the stop rollers 71 and the stop portions 72) as described above, only the first block 30, which includes the rod arm 31 and the cam frames 32, moves in the direction of the axis L1 (upward) while compressing the compression spring 6'. Along with this, the lever member 41 is caused to move in a direction perpendicular to the axis L1 toward the valve sheet 8 by the vertical motion mechanism.

As a result, the valve plate 4 moves from the intermediate position P2 to the hermetically closed position P3 as illustrated in FIG. 8. Note that, in normal vacuum processing in the chamber, this position is used as the hermetically closed position.

Note that, as illustrated in FIG. 5B and FIG. 5D, when the valve plate 4 is located at the hermetically closed position P3, the first guide rollers 27a and the second guide rollers 27b are both fitted in the guide grooves 33 of the cam frames 32. The first cam rollers 42a and the second cam rollers 42b are each located at the second position C2.

Next, the operations of the locking mechanisms 50 and the lock detection units 60 will be specifically described. When the valve plate 4 moves to the hermetically closed position P3, as illustrated in FIG. 10, the valve plate 4 moves to a position at which the engagement holes 32c formed in the cam frames 32 and the lock pistons 51 of the locking mechanisms 50 face each other, and the lock pistons 51 are caused to advance so as to be engaged in the engagement holes 32c by the urging springs 58. Thus, the valve plate 4 can be locked at the hermetically closed position P3.

Here, in a state where the valve plate 4 is locked by the locking mechanisms 50, as illustrated in FIG. 11B, each of the larger-diameter portions 61d of the target members 61 of the lock detection units 60 has moved to a position close to the distal end of the corresponding proximity sensor 63' in the longitudinal direction. Thus, each of the proximity sensors 63' has already output the detection signal indicating that the proximity sensor 63' has detected the corresponding larger-diameter portion 61d. Therefore, by the detection signal, the lock piston 51 can be determined to be in a state of being engaged in the engagement hole 32c.

Here, in the state illustrated in FIG. 11A, when the urging springs 58 break, the broken urging springs 58 cannot cause the lock pistons 51 to advance toward the engagement holes 32c. Thus, the valve plate 4 is not locked at the hermetically closed position P3. However, in a state where the lock pistons 51 have not advanced toward the engagement holes 32c, the smaller-diameter portions 61c of the target members 61 are close to the distal ends of the proximity sensors 63' in the longitudinal direction, and thus, each of the proximity sensors 63' does not output the detection signal. Thus, the lock pistons 51 can be determined not to be in a state of being engaged in the engagement holes 32c.

Accordingly, the gate valve 1 that is capable of determining whether the lock pistons 51 of the locking mechanisms 50 are in a state of being engaged in the engagement holes 32c can be provided.

Although the embodiment of the gate valve 1 according to the present invention has been described in detail above, the present invention is not limited to the above-described embodiment, and it is obvious that various design changes can be made within the gist of the present invention.

For example, in the above-described embodiment, although a case has been described in which the valve moving mechanism 29 enables the valve plate 4 to reciprocate between the hermetically closed position P3 and the full open position P1 via the intermediate position P2, the valve moving mechanism 29 may be enable the valve plate 4 to reciprocate between the hermetically closed position P3 and the full open position P1 without providing the intermediate position P2. In this case, the connecting member 6 is removed, and the lower end portion of the valve shaft 5 is connected to the rod arm 31. The upper ends of the cam frames 32 are connected to the lower surface 10b of the bonnet 10, and the lower ends of the cam frames 32 are detached from the rod arm 31. In addition, the first cam grooves 34a and the second cam grooves 34b of the cam frames 32 are each formed so as to be inclined toward the valve sheet 8 (the front side) from the upper side to the lower side. Thus, when the drive rods 21 of the air cylinders 20 expand and contract, the lever member 41 moves in the vertical direction and also moves in the longitudinal direction, and this enables the valve plate 4 to reciprocate between the full open position P1 and the hermetically closed position P3.

In addition, in the locking mechanisms 50, the shaft portions 51a of the lock pistons 51 are each formed so as to have a long length. In each of the cam frames 32 that face the distal ends of the shaft portions 51a in a state where the valve plate 4 has moved to the hermetically closed position P3, a through hole is formed so as to extend through the cam frame 32 in the transverse direction, and the engagement holes 32c are formed in side surfaces of the lever member 41 facing the through holes. Consequently, in a state where the valve plate 4 has moved to the hermetically closed position P3, the shaft portions 51a are capable of advancing and retreating with respect to their respective engagement holes 32c by passing through the through holes. Therefore, when the shaft portions 51a are engaged in the engagement holes 32c, the valve plate 4 can be locked.

In addition, in the above-described embodiment, although a case has been described in which each of the proximity sensors 63' outputs the detection signal when the corresponding lock piston 51 is in a state of being engaged in the corresponding engagement hole 32c and does not output the detection signal when the lock piston 51 is not in a state of being engaged in the engagement hole 32c, the present invention is not limited to this case. For example, each of the proximity sensors 63' may be configured not to output the detection signal when the corresponding lock piston 51 is in a state of being engaged in the corresponding engagement hole 32c and may be configured to output the detection signal when the lock piston 51 is not in a state of being engaged in the engagement hole 32c. In this case, the outer diameter of each of the larger-diameter portions 61d of the above-described target members 61 is set to be the same as the outer diameter of each of the smaller-diameter portions 61c, and the outer diameter of each of the smaller-diameter portions 61c is set to be the same as the outer diameter of each of the larger-diameter portions 61d.

REFERENCE SIGNS LIST 1 gate valve
2 gate opening
3 valve casing
4 valve plate
5 valve shaft
6 connecting member
20 air cylinder
21 drive rod
22 cylinder housing
22a cutout portion
23 drive piston
24a first pressure chamber
24b second pressure chamber
25a first port (port)
26 roller frame (facing wall)
29 valve moving mechanism
30 first block
32c engagement hole
40 second block
50 locking mechanism
51 lock piston
52 accommodating unit
53 accommodating hole
58 urging spring
59 unlocking pressure chamber
60 lock detection unit
61 target member to be detected
61c smaller-diameter portion
61d larger-diameter portion
63 detection main-body portion
63' proximity sensor
80 lock air flow path (lock air passage)
P1 full open position
P2 intermediate position
P3 hermetically closed position

The invention claimed is:
1. A gate valve in which a gate opening formed in a valve casing is opened and closed by a valve plate disposed in the valve casing, the gate valve comprising:
the valve plate;
a valve shaft that has an end portion attached to the valve plate and another end portion extending from the valve casing and that is supported in such a manner as to be movable with respect to the valve casing;
an air cylinder that is disposed outside the valve casing and that includes a drive rod; and
a valve moving mechanism that causes the valve plate to move along with expanding and contracting movements of the drive rod of the air cylinder via the valve shaft such that the valve plate reciprocates between a hermetically closed position at which the gate opening is hermetically closed by the valve plate and a full open position at which the gate opening is fully opened,
wherein the valve moving mechanism includes
a first block that is fixed to the drive rod,
a second block that is fixed to the valve shaft extending from the valve casing, and
a connecting member that connects the second block to the first block such that the second block is movable relative to the first block,
wherein the air cylinder includes a cylinder housing that supports the drive rod such that the drive rod is capable of expanding and contracting,
wherein the cylinder housing is provided with
a locking mechanism for locking the valve plate that has moved to the hermetically closed position and
a lock detection unit that is capable of determining whether the valve plate is in a state of being locked by the locking mechanism, wherein the locking mechanism includes a lock piston that is disposed in a facing wall of the cylinder housing, the facing wall facing the first block, so as to be capable of advancing and retreating with respect to the first block, wherein the first block has an engagement hole that is formed such that the lock piston that has advanced toward the first block is engaged in the engagement hole in a state in which the valve plate has moved to the hermetically closed position, and wherein the lock detection unit is capable of detecting whether the lock piston is in a state of being engaged in the engagement hole.

2. The gate valve according to claim 1,
wherein the lock detection unit includes
   a target member that is to be detected and that is provided at an end portion of the lock piston on a retreating side in such a manner as to extend toward the retreating side from and
   a detection main-body portion that detects the target member when the lock piston is in the state of being engaged in the engagement hole.

3. The gate valve according to claim 2,
wherein the detection main-body portion is a proximity sensor,
wherein the target member has a smaller-diameter portion that is formed on an advancing side in an advancing/retreating direction of the lock piston so as to extend in the advancing/retreating direction and a larger-diameter portion that is formed on the retreating side in the advancing/retreating direction so as to be larger than the smaller-diameter portion, and
wherein the proximity sensor detects the larger-diameter portion of the target member when the lock piston is in the state of being engaged in the engagement hole.

4. The valve according to claim 3,
wherein the lock piston, the target member, and the proximity sensor are arranged in an accommodating unit that is provided in the cylinder housing, and
wherein the accommodating unit is detachably attached to a cutout portion that is formed in the cylinder housing.

5. The valve according to claim 4,
wherein the proximity sensor is an inductive proximity sensor,
wherein the accommodating unit is made of a non-magnetic material, and
wherein the target member is made of a magnetic material that has electrical conductivity.

6. The gate valve according to claim 1,
wherein a drive piston that is fixed to the drive rod is provided in the cylinder housing of the air cylinder,
wherein a first pressure chamber that drives the valve plate from the full open position toward the hermetically closed position is formed in the cylinder housing so as to be closer to the drive rod than the drive piston is, and a second pressure chamber that drives the valve plate from the hermetically closed position toward the full open position is formed in the cylinder housing so as to be located on a side opposite to a side on which the drive rod is disposed with respect to the drive piston,
wherein the lock piston of the locking mechanism is accommodated in an accommodating hole that is formed in the facing wall of the cylinder housing,
wherein an urging spring that causes the lock piston to advance toward the first block is provided on the retreating side of the lock piston in the advancing/retreating direction,
wherein an unlocking pressure chamber for causing the lock piston to retreat is formed on the advancing side of the lock piston in the advancing/retreating direction, and
wherein the unlocking pressure chamber communicates with a lock air passage that is connected to a port through which compressed air is supplied to the second pressure chamber.

7. The valve according to claim 1,
wherein the valve moving mechanism causes the valve plate to reciprocate between the hermetically closed position and the full open position via an intermediate position at which the valve plate faces the gate opening with a distance between the valve plate and the gate opening.

\* \* \* \* \*